(12) United States Patent
Houde et al.

(10) Patent No.: US 12,158,424 B2
(45) Date of Patent: Dec. 3, 2024

(54) METHODS OF MEASURING EXOSOMES USING INTRINSIC FLUORESCENCE

(71) Applicant: LONZA SALES AG, Basel (CH)

(72) Inventors: Damian J. Houde, Plymouth, MA (US); Young Jun Choi, Cambridge, MA (US); John D. Kulman, Belmont, MA (US); Douglas E. Williams, Boston, MA (US)

(73) Assignee: LONZA SALES AG, Basel (CH)

( * ) Notice: Subject to any disclaimer, the term of this patent is extended or adjusted under 35 U.S.C. 154(b) by 0 days.

(21) Appl. No.: 17/706,281

(22) Filed: Mar. 28, 2022

(65) Prior Publication Data

US 2022/0326158 A1     Oct. 13, 2022

Related U.S. Application Data

(63) Continuation of application No. 16/470,180, filed as application No. PCT/US2017/066324 on Dec. 14, 2017, now abandoned.

(60) Provisional application No. 62/542,697, filed on Aug. 8, 2017, provisional application No. 62/434,985, filed on Dec. 15, 2016.

(51) Int. Cl.
*G01N 21/64* (2006.01)
*G01N 21/76* (2006.01)

(52) U.S. Cl.
CPC ......... *G01N 21/6486* (2013.01); *G01N 21/76* (2013.01)

(58) Field of Classification Search
CPC ............................ G01N 21/6486; G01N 21/76
See application file for complete search history.

(56) References Cited

U.S. PATENT DOCUMENTS

| | | | |
|---|---|---|---|
| 6,291,201 B1 | 9/2001 | Garman et al. | |
| 10,052,019 B1 | 8/2018 | Jiao et al. | |
| 2002/0071843 A1* | 6/2002 | Li | A61K 49/16 424/155.1 |
| 2003/0236458 A1 | 12/2003 | Hochman | |
| 2007/0160658 A1* | 7/2007 | Connor | A61K 9/1271 424/85.2 |
| 2008/0227722 A1* | 9/2008 | Wang | A61K 49/0021 514/18.3 |
| 2009/0035783 A1 | 2/2009 | Yang | |
| 2011/0034554 A1* | 2/2011 | Washington | A61K 9/0048 514/703 |
| 2013/0078658 A1 | 3/2013 | Park et al. | |
| 2013/0203081 A1 | 8/2013 | Rak et al. | |
| 2014/0186264 A1 | 7/2014 | Taylor et al. | |
| 2015/0037837 A1* | 2/2015 | Asehnoune | G01N 33/49 435/40.51 |
| 2016/0082131 A1* | 3/2016 | Page | A61K 49/0054 530/323 |
| 2018/0353482 A1* | 12/2018 | Fontaine | A61P 27/02 |

FOREIGN PATENT DOCUMENTS

| | | |
|---|---|---|
| WO | 2016034775 A1 | 3/2016 |
| WO | 2018112154 A1 | 6/2018 |
| WO | 2019246591 A1 | 12/2019 |

OTHER PUBLICATIONS

Croce (European J Histochemistry 2014 58:2461) (Year: 2014).*
2014.*
Cwanger ARVO Annual Meeting Abstract Jun. 2015 (Year: 2015).*
2015.*
International Search Report and Written Opinion mailed Feb. 16, 2018, in International Application No. PCT/ US2017/066324, Isa, United States, 11 pages.
Bhaduri, B., et al., "Optical Assay of Erythrocyte Function in Banked Blood," Scientific Reports 4:6211, Nature Publishing Group (Sep. 5, 2014).
Bryan, A.K., et al., "Measuring single cell mass, vol. and density with dual suspended microchannel resonators," Lab Chip 14(3):569-576, Royal Society of Chemistry, United Kingdom (Feb. 7, 2014).
Byun, S., et al., "Characterizing deformability and surface friction of cancer cells," PNAS 110(19):7580-7585, Proceedings of the National Academy of Sciences of the United States, United States (May 7, 2013).
Delgado, F.F., et al., "Intracellular Water Exchange for Measuring the Dry Mass, Water Mass and Changes in Chemical Composition of Living Cells," Plos One 8(7): e67590, Public Library of Science, United States (Jul. 2, 2013).
Haidekker, M.A., et al., "New fluorescent probes for the measurement of cell membrane viscosity," Chem Biol 8 (2): 123-131, Cell Press, Netherlands (Dec. 19, 2000).
Melo, S.A., et al., "Glypican-1 identifies cancer exosomes and facilitates early detection of cancer," Nature 523 (7559): 177-182, Nature Publishing Group, United Kingdom (Jul. 9, 2015).
HELD (Agilent Application Note Rapid Cell Signaling 2014).
Gilissen, et al., "Distinct Types of Lipofuscin Pigment in the Hippocampus and Cerebellum of Aged Cheirogaleid Primates", The Anatomical Record, 1895-1906 (Oct. 10, 2013).
Kellner, et al., "Lipofuscin - and Melanin- Related Fundus Autofluorescence Visualize Different Retinal Pigment Epithelial Alterations in Patients with Retinitis Pigmentosa", Eye (2009), 1349-1359.

(Continued)

*Primary Examiner* — Changhwa J Cheu
(74) *Attorney, Agent, or Firm* — MEDLER FERRO WOODHOUSE & MILLS PLLC; Jeffrey K. Mills

(57) ABSTRACT

Described herein are novel rapid and reliable methods of detection of extracellular vesicles and quantifying extracellular vesicle concentrations and absolute number from various sources, including raw cell harvest. The methods described herein comprise detection of intrinsic fluorescence of extracellular vesicles in biological samples. Extracellular vesicles analyzed by the methods of this application have a stereotypical elution profile distinct from known contaminants. The methods described herein are a significant improvement over the state of the art and fulfills an unmet need in the field of extracellular vesicle manufacturing and quality control.

14 Claims, 25 Drawing Sheets

(56) References Cited

OTHER PUBLICATIONS

Requirement for Restriction in US Application No. 16/470, 180, dated May 4, 2021.
Non-Final Office Action in US Application No. 16/470, 180, dated Dec. 27, 2021.
Notice of Abandonment in US Application No. 16/470, 180, dated Sep. 6, 2022.

* cited by examiner

Default, "Off" State:
0 – 3.5 minutes
4.5 – 40 minutes

"ON" State:
3.5 – 4.5 minutes

METHODS OF MEASURING EXOSOMES USING INTRINSIC FLUORESCENCE

CROSS REFERENCE TO RELATED APPLICATIONS

This application is a continuation application of U.S. patent application Ser. No. 16/470,180, which is the U.S. National Stage Application of International Application No. PCT/US2017/066324, filed on Dec. 14, 2017, which claims the priority benefit under 35 U.S.C. § 119(e) of U.S. Provisional Application Ser. No. 62/434,985, filed on 15 Dec. 2016, and 62/542,697, filed on Aug. 8, 2017, both of which are incorporated by reference herein in their entirety.

BACKGROUND OF THE INVENTION

Description of the Related Art

Exosomes and other small extracellular vesicles are increasingly well-recognized biological particles. Although extracellular vesicles are beginning to be used in commercial processes and produced in industrial quantities, methods of accurately and rapidly measuring extracellular vesicle concentration and absolute number remain scarce. Current approaches for the detection, isolation and purification of extracellular vesicles derived from cell culture or other biological samples requires laborious and time consuming methods. For example, current ultra-centrifugation protocols are commercially unreproducible, as they produce a heterogeneous mix of extracellular vesicles, other cellular vesicles and macromolecular complexes and can lead to vesicle aggregation. Therefore, novel methods for efficient, low-cost and reliable purification and quantification of extracellular vesicles are needed.

SUMMARY OF THE INVENTION

Disclosed herein are methods for the detection of extracellular vesicles comprising detecting intrinsic fluorescence of the extracellular vesicles without the use of additional dyes, fluorophores, markers, or imaging compounds. In certain embodiments, this application describes methods of detecting extracellular vesicles comprising, obtaining a sample comprising extracellular vesicles and determining an intrinsic fluorescence emission signal from the sample, wherein the intrinsic fluorescence emission signal is indicative of the presence of the extracellular vesicles within the sample. In an aspect, the intrinsic fluorescence emission signal is generated using an excitation wavelength ranging from 450 nm to 650 nm and an emission wavelength that is longer than the excitation wavelength and ranging from 470 nm to 670 nm. In an aspect, the intrinsic fluorescence emission signal is determined at an emission wavelength range of 500-600 nm. In an aspect, the intrinsic fluorescence emission signal is determined at an emission wavelength range of 550-590 nm. In an aspect, the intrinsic fluorescence emission signal is determined at an emission wavelength of 573 nm. In an aspect, the intrinsic fluorescence emission signal is determined at an excitation wavelength range of 500-600 nm. In an aspect, the intrinsic fluorescence emission signal is determined at an excitation wavelength range of 530-570 nm. In an aspect, the intrinsic fluorescence emission signal is determined at an excitation wavelength of 556 nm. In an aspect, the intrinsic fluorescence emission signal is determined at an excitation wavelength of 550 nm and an emission of 570 nm.

In certain aspects, the sample is separated into fractions prior to determining said intrinsic fluorescence emission signal. In certain aspects, separation comprises a column chromatography separation step. In certain aspects, separation comprises two column chromatography separation steps. In an aspect, one or both of the chromatography steps is size exclusion chromatography. In an aspect, one or both of the chromatography is ion exchange chromatography. In an aspect, said ion exchange chromatography is strong anion exchange chromatography. In an aspect, said two chromatography steps are anion-exchange chromatography and size-exclusion chromatography. In an aspect, said anion-exchange chromatography precedes said size-exclusion chromatography. In certain aspects, the said intrinsic fluorescence emission signal is determined using a flow cell. In certain aspects, the sample is subjected to a filtration step prior to determining said intrinsic fluorescence emission signal. In certain aspects, the sample is subjected to a centrifugation separation step prior to determining said intrinsic fluorescence emission signal. In certain aspects, the sample is subjected to a sucrose density gradient step prior to determining said intrinsic fluorescence emission signal. In certain aspects, the sample is subjected to a separation step comprising use of a density gradient medium prior to determining said intrinsic fluorescence emission signal.

In certain aspects, the sample is derived from a cell culture. In certain aspects, the cell culture comprises human embryonic kidney cells, mesenchymal stem cells or neuronal cells. In certain aspects, the sample is derived from a body fluid of an animal.

In certain aspects, the method comprises determining an amount of the extracellular vesicles within the sample comprising comparing the intrinsic fluorescence emission signal to the intrinsic fluorescence emission signal of a standard. In certain aspects, the method comprises quantifying the amount of extracellular vesicles within the sample, based upon the area under of the curve of a chromatogram comprising the intrinsic fluorescence emission signal. In certain aspects, the method comprises determining an amount of the extracellular vesicles within the sample comprising comparing the intrinsic fluorescence emission signal to the luminescence signal of a standard. In certain aspects, the luminescence signal is derived from a luminescence proximity assay. In certain aspects, the luminescence proximity assay is an AlphaScreen™ assay recognizing exosome-associated proteins such as CD9, CD63, and/or CD81. In certain aspects, the luminescence proximity assay is used to detect exosomes independent of their intrinsic fluorescence.

In certain aspects, the extracellular vesicle is an exosome. In certain aspects, the extracellular vesicle is a nanovesicle.

In certain aspects, the extracellular vesicle comprises a therapeutic payload.

BRIEF DESCRIPTION OF THE SEVERAL VIEWS OF THE DRAWINGS

These and other features, aspects, and advantages of the present invention will become better understood with regard to the following description, and accompanying drawings, where.

DETAILED DESCRIPTION

Advantages and utility

Figure 1A:
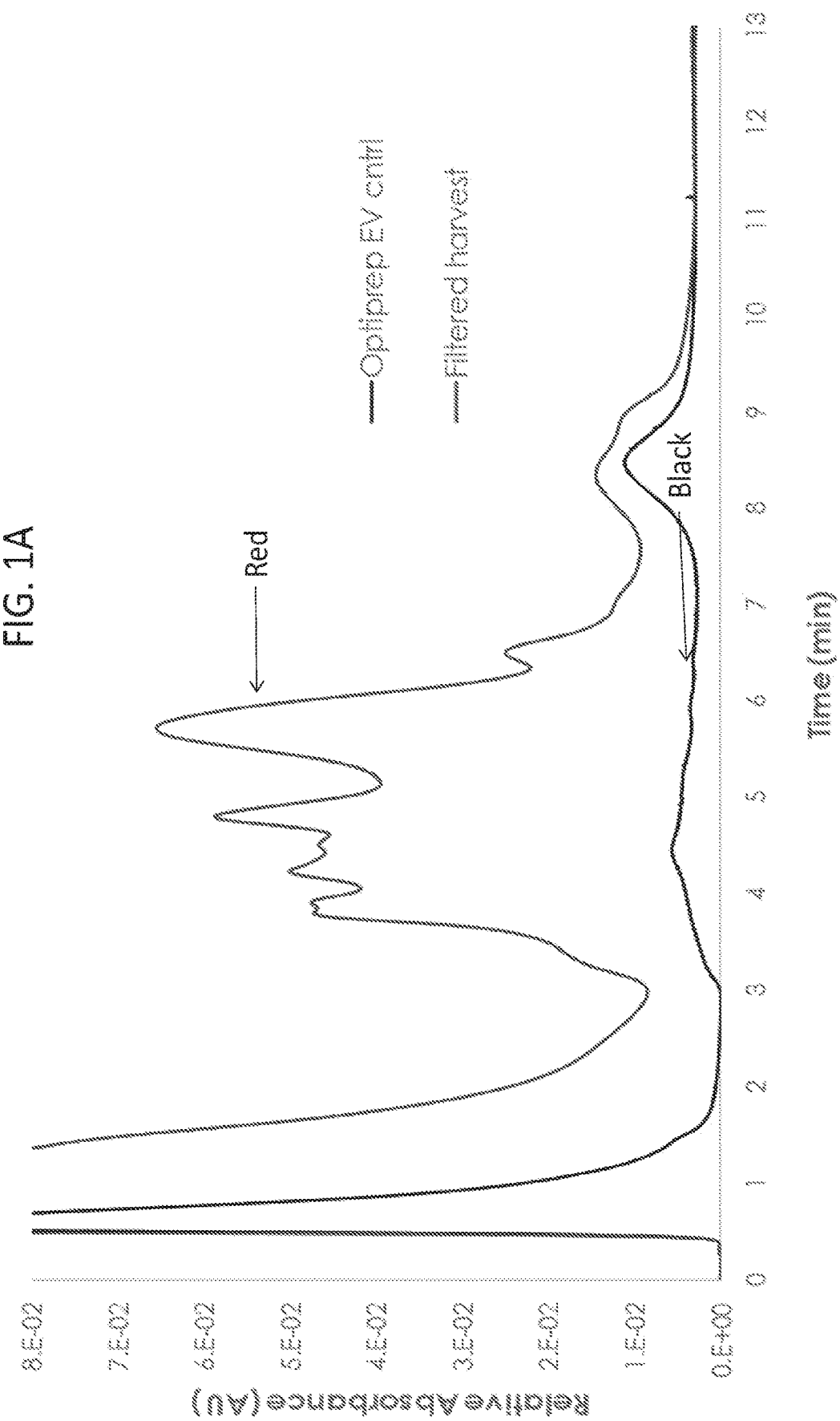
FIG. 1A illustrates a comparison of the absorbance profiles from strong anion-exchange chromatography (AEX) of HEK293 SF cell harvest (red trace) and Optiprep™ density gradient purified exosomes (black trace). Representative transmission electron micrograph of the Optiprep™ purified exosome stock is shown.

Briefly, and as described in more detail below, is a rapid and reliable method of quantifying extracellular vesicle concentrations and absolute number from various sources, including raw cell harvest without the use of additional dyes, fluorophores, markers, or imaging compounds. Extracellular vesicle detection and quantification typically relies on nanoparticle tracking assays and other methods that are heavily dependent on the purity of extracellular vesicle preparations, and often rely on the addition of lipophilic dyes or other compounds and/or agents to aid in the detection of vesicles. Extracellular vesicles analyzed by the methods of the invention have a stereotypical elution profile as measured by fluorescence distinct from known contaminants. The methods described herein are a significant improvement over the state of the art and fulfill an unmet need in the field of extracellular vesicle manufacturing and quality control.

Definitions

Terms used in the claims and specification are defined as set forth below unless otherwise specified.

As used herein, the terms "intrinsic fluorescence," "autofluorescence," and "auto-fluorescence" refer to the natural emission of light by biological structures when they have absorbed light, and are distinguished from light originating from artificially added fluorescent markers, dyes, or fluorophores.

As used herein, the term "extracellular vesicle" refers to a cell-derived vesicle comprising a membrane that encloses an internal space. Extracellular vesicles comprise all membrane-bound vesicles that have a smaller diameter than the cell from which they are derived. Generally extracellular vesicles range in diameter from 20 nm to 1000 nm, and may comprise various macromolecular cargo either within the internal space, displayed on the external surface of the extracellular vesicle, and/or spanning the membrane. Said cargo may comprise nucleic acids, proteins, carbohydrates, lipids, small molecules, and/or combinations thereof. By way of example and without limitation, extracellular vesicles include apoptotic bodies, fragments of cells, vesicles derived from cells by direct or indirect manipulation (e.g., by serial extrusion or treatment with alkaline solutions), vesiculated organelles, and vesicles produced by living cells (e.g., by direct plasma membrane budding or fusion of the late endosome with the plasma membrane). Extracellular vesicles may be derived from a living or dead organism, explanted tissues or organs, and/or cultured cells.

As used herein, the term "nanovesicle" refers to a cell-derived small (between 20-250 nm in diameter, more preferably 30-150 nm in diameter) vesicle comprising a membrane that encloses an internal space, and which is generated from said cell by direct or indirect manipulation such that said nanovesicle would not be produced by said producer cell without said manipulation. Appropriate manipulations of said producer cell include but are not limited to serial extrusion, treatment with alkaline solutions, sonication, or combinations thereof. The production of nanovesicles may, in some instances, result in the destruction of said producer cell. Preferably, populations of nanovesicles are substantially free of vesicles that are derived from producer cells by way of direct budding from the plasma membrane or fusion of the late endosome with the plasma membrane. The nanovesicle comprises lipid or fatty acid and polypeptide, and optionally comprises a payload (e.g., a therapeutic agent), a receiver (e.g., a targeting moiety), a polynucleotide (e.g., a nucleic acid, RNA, or DNA), a sugar (e.g., a simple sugar, polysaccharide, or glycan) or other molecules. The nanovesicle, once it is derived from a producer cell according to said manipulation, may be isolated from the producer cell based on its size, density, biochemical parameters, or a combination thereof.

As used herein, the term "exosome" refers to a cell-derived small (between 20-300 nm in diameter, more preferably 40-200 nm in diameter) vesicle comprising a membrane that encloses an internal space, and which is generated from said cell by direct plasma membrane budding or by fusion of the late endosome with the plasma membrane. Generally, production of exosomes does not result in the destruction of the producer cell. The exosome comprises lipid or fatty acid and polypeptide, and optionally comprises a payload (e.g., a therapeutic agent), a receiver (e.g., a targeting moiety), a polynucleotide (e.g., a nucleic acid, RNA, or DNA), a sugar (e.g., a simple sugar, polysaccharide, or glycan) or other molecules. The exosome can be derived from a producer cell, and isolated from the producer cell based on its size, density, biochemical parameters, or a combination thereof.

As used herein, the terms "parent cell" or "producer cell" include any cell from which an extracellular vesicle may be isolated. The terms also encompass a cell that shares a protein, lipid, sugar, or nucleic acid component of the extracellular vesicle. For example, a "parent cell" or "producer cell" may include a cell which serves as a source for the extracellular vesicle membrane.

As used herein, the terms "purify," "purified," and "purifying" or "isolate," "isolated," or "isolating" or "enrich," "enriched" or "enriching" are used interchangeably and refer to the state of a population (e.g., a plurality of known or unknown amount and/or concentration) of desired extracellular vesicles, that have undergone one or more processes of purification, e.g., a selection or an enrichment of the desired extracellular vesicles composition, or alternatively a removal or reduction of residual biological products as described herein. In some embodiments, a purified extracellular vesicles composition has no detectable undesired activity or, alternatively, the level or amount of the undesired activity is at or below an acceptable level or amount. In other embodiments, a purified extracellular vesicle composition has an amount and/or concentration of desired extracellular vesicles at or above an acceptable amount and/or concentration. In other embodiments, the purified extracellular vesicle composition is enriched as compared to the starting material (e.g., biological material collected from tissue, bodily fluid, or cell preparations) from which the composition is obtained. This enrichment may be by 10%, 20%, 30%, 40%, 50%, 60%, 70%, 80%, 90%, 95%, 96%, 97%, 98%, 99%, 99.9%, 99.99%, 99.999%, 99.9999%, or greater than 99.9999% as compared to the starting material.

Abbreviations used in this application include the following: Size-exclusion chromatography (SEC), Anion Exchange Chromatography (AEX), Two-dimensional liquid chromatography (2D-LC), Nanoparticle tracking analysis (NTA), Resistive pulse sensing (RPS), extracellular vesicles (EV or EVs), Phosphate Buffered Saline (PBS) and Fluorescent Activated Cell Sorting (FACS).

It must be noted that, as used in the specification and the appended claims, the singular forms "a," "an" and "the" include plural referents unless the context clearly dictates otherwise.

Methods of the invention

Sources of Extracellular Vesicles

Described herein are methods for the detection and quantification of extracellular vesicle from biological samples. Biological samples can include, but are not limited to, raw cell culture harvest, clarified cell culture medium, enriched extracellular vesicle preparations, partially purified extracellular vesicle preparations (e.g., by a single two-hour ultracentrifugation step), or highly purified extracellular vesicle preparations (e.g., extracellular vesicle preparations additionally purified using a density gradient medium (e.g., sucrose density gradient medium or medium comprising an iodixanol solution (Sigma-Aldrich).

The parent cell can be cultured. Cultured parent cells can be scaled up from bench-top scale to bioreactor scale. For example, the parent cells are cultured until they reach saturation density, e.g., $1\times10^5$, $1\times10^6$, $1\times10^7$, or greater than $1\times10^7$ complexes per ml. Optionally, upon reaching saturation density, the parent cells can be transferred to a larger volume of fresh medium. The parent cells may be cultured in a bioreactor, such as, e.g., a Wave-type bioreactor, a stirred-tank bioreactor. Various configurations of bioreactors are known in the art and a suitable configuration may be chosen as desired. Configurations suitable for culturing and/or expanding populations of parent cells can easily be determined by one of skill in the art without undue experimentation. The bioreactor can be oxygenated. The bioreactor may optionally contain one or more impellers, a recycle stream, a media inlet stream, and control components to regulate the influx of media and nutrients or to regulate the outflux of media, nutrients, and waste products.

Enrichment of Extracellular Vesicle Preparations

With respect to purification or enrichment of extracellular vesicles, it is contemplated that all known manners of purification of extracellular vesicles are deemed suitable for use herein. For example, physical properties of extracellular vesicles may be employed to separate them from a medium or other source material, including separation on the basis of electrical charge (e.g., electrophoretic separation, ion-exchange chromatography), size (e.g., filtration, size-exclusion chromatography, molecular sieving, etc.), density (e.g., regular or gradient centrifugation), Svedberg constant (e.g., sedimentation with or without external force, etc.). For ion-exchange chromatography, any suitable methods known in the art may be used including, but not limited to, anion-exchange chromatography, and strong-anion exchange chromatography. For density gradient centrifugation, any appropriate density gradient medium used in the art may be used, including, but not limited to, sucrose density gradient medium and mediums comprising, iodixanol solution, colloidal silica, inorganic salts, polyhydric alcohols, polysaccharides, poly(vinyl alcohol), iohexol and nonionic iodinated media. Purification of the extracellular vesicles may be performed by manually loading columns or other devices, or may be automated using devices such an autosampler.

Alternatively, or additionally, isolation can be based on one or more biological properties, and include methods that can employ surface markers (e.g., precipitation, reversible binding to solid phase, FACS separation, separation using magnetic surfaces, specific ligand binding, immunoprecipitation or other antibody-mediated separation techniques, non-specific ligand binding such as annexin V, etc.). In yet further contemplated methods, the extracellular vesicles can also be fused using chemical and/or physical methods, including PEG-induced fusion and/or ultrasonic fusion.

In certain embodiments, enrichment of extracellular vesicles can be done in a general and non-selective manner (e.g., methods comprising serial centrifugation), and can be performed by aggregation where the extracellular vesicles are interlinked with an interlinking composition (e.g., annexin V, fibrin, or an antibody or fragment thereof against at least one of a tetraspanin, ICAM-1, CD86, CD63). Alternatively, enrichment of extracellular vesicles can be done in a more specific and selective manner (e.g., using tissue or cell specific surface markers). For example, specific surface markers can be used in immunoprecipitation, FACS sorting, bead-bound ligands for magnetic separation, etc.

In some embodiments, size exclusion chromatography can be utilized to enrich the extracellular vesicles. Size exclusion chromatography techniques are known in the art. Exemplary, non-limiting techniques are provided herein. In some embodiments, a void volume fraction is isolated and comprises extracellular vesicles of interest. Further, in some embodiments, the extracellular vesicles can be further isolated after chromatographic separation by centrifugation techniques (of one or more chromatography fractions), as is generally known in the art. In some embodiments, for example, density gradient centrifugation can be utilized to further enrich the extracellular vesicles. Still further, in some embodiments, it can be desirable to further separate the parent-cell derived extracellular vesicles from extracellular vesicles of other origin. For example, the parent cell extracellular vesicles can be separated from non-parent cell-derived extracellular vesicles by immunosorbent capture using an antigen antibody specific for the parent cell. For example, anti-CD63 antibodies can be used.

In some embodiments, the isolation of extracellular vesicles can involve combinations of methods that include, but are not limited to, differential centrifugation, size-based membrane filtration, concentration and/or rate zonal centrifugation, and further characterized using methods that include, but are not limited to, electron microscopy, flow cytometry and Western blotting.

Extracellular vesicles can be extracted from the supernatant of parent cells and demonstrate membrane and internal protein, lipid, and nucleic acid compositions that enable their efficient delivery to and interaction with recipient cells. Extracellular vesicles can be derived from parent cells that may include, but are not limited to, reticulocytes, erythrocytes, megakaryocytes, platelets, neutrophils, tumor cells, connective tissue cells, neural cells and stem cells. Suitable sources of extracellular vesicles include but are not limited to, cells isolated from subjects from patient-derived hematopoietic or erythroid progenitor cells, immortalized cell lines, or cells derived from induced pluripotent stem cells, optionally cultured and differentiated. Cell culture protocols can vary according to compositions of nutrients, growth factors, starting cell lines, culture period, and morphological traits by which the resulting cells are characterized. In some embodiments, the samples comprising extracellular vesicles are derived from a plurality of donor cell types (e.g., 2, 3, 4, 5, 6, 7, 8, 9, 10, 50, 100, 500, 1000, 5000, or 10000 donor cell types) and are combined or pooled. Pooling may occur by mixing cell populations prior to extracellular vesicles extraction or by mixing isolated extracellular vesicles compositions from subsets of donor cell types. Parent cells may be irradiated or otherwise treated to affect the production rate and/or composition pattern of secreted extracellular vesicles prior to isolation.

In certain embodiments, the extracellular vesicles may be derived from cell lines that are differentiated, proliferated and cultured in-vitro. This enables controllable and reproducible compositions of extracellular vesicles that are not subject to constraints on isolation and purification of the requisite parent cell type.

In certain embodiments, the samples comprising the extracellular vesicles are obtained from raw cell harvest and the intrinsic fluorescence is determined. In certain embodiments, the raw cell harvest is clarified for larger cells and cellular debris prior to determination of the intrinsic fluorescence. In certain embodiments, the samples comprising the extracellular vesicles are further purified using any of the above mentioned methods for enrichment of the extracellular vesicles prior to determination of the intrinsic fluorescence of the samples.

In certain embodiments, the methods comprise fractionating the sample prior to determination of the intrinsic fluorescence. In certain embodiments, the method comprises the steps of loading the extracellular vesicle preparation on a size exclusion chromatography (SEC) column (e.g., a sepharose resin SEC column). In certain embodiments, the methods comprise the steps of loading the extracellular vesicle preparation on an ion exchange chromatography column. In certain embodiments, the methods comprise the steps of loading the extracellular vesicle preparation on a strong anion exchange chromatography column.

Detection of Intrinsic Florescence

In certain embodiments, the intrinsic fluorescence of the eluted fractions from columns used for separation and/or fractionation of the samples comprising the extracellular vesicles are detected in a single step. In certain embodiments, the intrinsic fluorescence of the eluted fractions from the columns used for separation and/or fractionation is detected in multiple steps. In certain embodiments, the detection of intrinsic fluorescence of the eluted fractions is detected after the fractions have been further processed or stored for a period of time. In certain embodiments, the eluted fractions are analyzed for intrinsic fluorescence on the same device as the device used for separation and/or fractionation of the sample comprising the extracellular vesicles. In certain embodiments, the fractions are analyzed for intrinsic fluorescence on a separate device as the device used for separation and/or fractionation of the sample comprising the extracellular vesicles. In certain embodiments, the sample fractions are collected using a flow-cell.

The relative amounts or concentrations of extracellular vesicle are determined by measurement of intrinsic fluorescence using standard techniques. Detection and/or measurement of intrinsic fluorescence can be performed manually by fluorescent microscopy or determined using automated systems for fluorescent detection. In certain embodiments, intrinsic fluorescence of the extracellular vesicle preparations or fractions of extracellular vesicle preparation is determined using a microplate reader or any other acceptable method known in the art for the detection and measurement of fluorescence in a sample.

In certain embodiments, extracellular vesicle preparation can be sorted by flow cytometry, e.g., bead-based flow cytometry as described in Melo et al. (Nature, 2015 Jul. 9; 523[7559]:177-82) based on intrinsic fluorescence at particular excitation and emission spectra.

In certain embodiments, the intrinsic fluorescence profile of extracellular vesicles is detected at a range between 450 and 550 nm absorbance wavelength and at a range between 470 to 570 nm emission wavelength. In certain embodiments, the intrinsic fluorescence profile of extracellular vesicles is detected at a range between 450 and 460 nm, 460 and 470 nm, 470 and 480 nm, 480 and 490 nm, 490 and 500 nm, 500 and 510 nm, 510 and 520 nm, 520 and 530 nm and 540 and 550 nm absorbance wavelength. In certain embodiments, the intrinsic fluorescence profile of extracellular vesicles is detected at a range between 470 and 480 nm, 480 and 490 nm, 490 and 500 nm, 500 and 510 nm, 520 and 530 nm, 530 and 540 nm, 540 and 550 nm, 550 and 560 nm and 560 and 570 nm emission wavelength. In an aspect, the intrinsic fluorescence emission signal is generated using an excitation wavelength ranging from 450 nm to 650 nm and an emission wavelength that is longer than the excitation wavelength and ranging from 470 nm to 670 nm. In an aspect, the intrinsic fluorescence emission signal is determined at an emission wavelength range of 500-600 nm. In an aspect, the intrinsic fluorescence emission signal is determined at an emission wavelength range of 550-590 nm. In an aspect, the intrinsic fluorescence emission signal is determined at an emission wavelength of 573 nm. In an aspect, the intrinsic fluorescence emission signal is determined at an excitation wavelength range of 500-600 nm. In an aspect, the intrinsic fluorescence emission signal is determined at an excitation wavelength range of 530-570 nm. In an aspect, the intrinsic fluorescence emission signal is determined at an excitation wavelength of 556 nm. In an aspect, the intrinsic fluorescence emission signal is determined at an excitation wavelength of 550 nm and an emission of 570 nm.

In each embodiment, the excitation and emission wavelengths are selected so that the excitation wavelength is shorter than the emission wavelength. In certain aspects, the absorbance wavelength varies according to the membrane composition and/or payload composition of the extracellular vesicle. In certain aspects, the emission wavelength varies according to the membrane composition and/or payload composition of the extracellular vesicle. In certain aspects, the emission wavelength and/or absorbance wavelength varies according to the homogeneity of the extracellular vesicle preparation. In certain aspects, the absorbance wavelength and/or emission wavelength used to detect the extracellular vesicle varies according to the type of producer cell from which the extracellular vesicle is derived. In certain aspects, the absorbance wavelength and/or emission wavelength used to detect the extracellular vesicle varies according to the purity of the extracellular preparation prior to detection of the extracellular vesicles.

Quantitation of Concentration of Extracellular Vesicle Preparations

In certain aspects, the methods comprise displaying the absorbance and/or emission spectra obtained from the sample on a chromatogram. In certain aspects, the relative amounts or concentrations of extracellular vesicles in the sample or a fraction of the sample is obtained by calculating the area under the resulting absorbance curve of the chromatogram and calculating the same using a quantification standard, wherein the standard is applied to a similar extracellular vesicle preparation. The concentration of the extracellular vesicles in the quantification standard can be measured by any of the known methods in the art and, in certain embodiments, can be independently verified by more than one technique, such as, but not limited to, electron microscopy, flow cytometry analysis of extracellular vesicles harboring exogenous fluorescent molecules, nanoparticle tracking analysis, resistive pulse sensing, and determination of total protein concentrations.

In certain aspects, the methods comprise determining the relative amounts of extracellular vesicles in a sample by measuring a luminescence signal. This signal can be used to directly measure the amounts of extracellular vesicles, or can be used as a standard based on the methods described herein used to measure the intrinsic fluorescence signature of extracellular vesicle samples. In an aspect, the luminescence signal is a luminescence proximity assay, which relies on the generation of excited ambient oxygen species to induce chemiluminescence in a nearby acceptor fluorophore. In certain aspects, the luminescence assay comprises antibodies that bind to exosomes-associate proteins such as CD9, CD63,CD81, and combinations thereof. In certain aspects, the luminescence assay is an AlphaScreen™ assay.

Further assessments and Characterizations of Extracellular Vesicle Preparations

The identity and concentration of the extracellular vesicles in a preparation or fraction and/or the quantification standard sample can be assessed and/or validated by in vitro assays. For example, the identity and concentration of the extracellular vesicles is determined by counting the number of complexes in a population, e.g., by microscopy, by flow cytometry, or by hemacytometry. Alternatively, or in addition, the identity and/or concentration of the extracellular vesicles is assessed by analysis of protein content of the complex, e.g., by flow cytometry, Western blot, immunoprecipitation, fluorescence spectroscopy, chemiluminescence, mass spectrometry, or absorbance spectroscopy. In an embodiment, the protein content assayed is a non-surface protein, e.g., an integral membrane protein, hemoglobin, adult hemoglobin, fetal hemoglobin, embryonic hemoglobin, or a cytoskeletal protein. In an embodiment, the protein content assayed is a surface protein, e.g., a differentiation marker, a receptor, a co-receptor, a transporter, a glycoprotein. In an embodiment, the surface protein is selected from the list including, but not limited to, glycophorin A, CKIT, transferrin receptor, Band3, Kell, CD45, CD46, CD47, CD55, CD59, CR1, CD9, CD63 and CD81. In an embodiment, the identity of extracellular vesicles is assessed by analysis of the receiver content of the vesicle, e.g., by flow cytometry, Western blot, immunoprecipitation, fluorescence spectroscopy, chemiluminescence, mass spectrometry, or absorbance spectroscopy. For example, the identity of the extracellular vesicles can be assessed by the mRNA content of the complexes, e.g., by RT-PCR, flow cytometry, or northern blot. The identity of the extracellular vesicles can be assessed by nuclear material content, e.g., by flow cytometry, microscopy, or southern blot, using, e.g., a nuclear stain or a nucleic acid probe. Alternatively, or in addition, the identity of the extracellular vesicles is assessed by lipid content of the complexes, e.g., by flow cytometry, liquid chromatography, or by mass spectrometry.

In some embodiments, the identity of the extracellular vesicles is assessed by metabolic activity of the complexes, e.g., by mass spectrometry, chemiluminescence, fluorescence spectroscopy, absorbance spectroscopy. Metabolic activity can be assessed by ATP consumption rate and/or the metabolic activity is assessed measuring 2,3-diphosphoglycerate (2,3-DPG) level in the parent cells or extracellular vesicles. The metabolic activity can be assessed as the rate of metabolism of one of the following, including but not limited to, acetylsalicylic acid, n-acetylcystein, 4-aminophenol, azathioprine, bunolol, captopril, chlorpromazine, dapsone, daunorubicin, dehydroepiandrosterone, didanosin, dopamine, epinephrine, esmolol, estradiol, estrone, etoposide, haloperidol, heroin, insulin, isoproterenol, isosorbide dinitrate, ly 217896, 6-mercaptopurine, misonidazole, nitroglycerin, norepinephrine, para-aminobenzoic acid. In some embodiments, the identity of the extracellular vesicles is assessed by partitioning of a substrate by the complexes, e.g., by mass spectrometry, chemiluminescence, fluorescence spectroscopy, or absorbance spectroscopy. The substrate can be one of the following, including but not limited to, acetazolamide, arbutine, bumetamide, creatinine, darstine, desethyldorzolamide, digoxigenin digitoxoside, digoxin-16'-glucuronide, epinephrine, gentamycin, hippuric acid, metformin, norepinephrine, p-aminohippuric acid, papaverine, penicillin g, phenol red, serotonin, sulfosalicylic acid, tacrolimus, tetracycline, tucaresol, and vancomycin.

In some embodiments, the extracellular vesicles are assessed for their basic physical properties, e.g., size, mass, volume, diameter, buoyancy, density, and membrane properties, e.g., viscosity, deformability fluctuation, and fluidity. In an embodiment, the diameter of the extracellular vesicles is measured by microscopy or by automated instrumentation, e.g., a hematological analysis instrument or by resistive pulse sensing. In some embodiments, the extracellular vesicle has a longest dimension between about 20-300 nm, such as between about 20-290 nm, 20-280 nm, 20-270 nm, 20-260 nm, 20-250 nm, 20-240 nm, 20-230 nm, 20-220 nm, 20-210 nm, 20-200 nm, 20-190 nm, 20-180 nm, 20-170 nm, 20-160 nm, 20-150 nm, 20-140 nm, 20-130 nm, 20-120 nm, 20-110 nm, 20-100 nm, 20-90 nm, 20-80 nm, 20-70 nm, 20-60 nm, 20-50 nm, 20-40 nm, 20-30 nm, 30-300 nm, 30-290 nm, 30-280 nm, 30-270 nm, 30-260 nm, 30-250 nm, 30-240 nm, 30-230 nm, 30-220 nm, 30-210 nm, 30-200 nm, 30-190 nm, 30-180 nm, 30-170 nm, 30-160 nm, 30-150 nm, 30-140 nm, 30-130 nm, 30-120 nm, 30-110 nm, 30-100 nm, 30-90 nm, 30-80 nm, 30-70 nm, 30-60 nm, 30-50 nm, 30-40 nm, 40-300 nm, 40-290 nm, 40-280 nm, 40-270 nm, 40-260 nm, 40-250 nm, 40-240 nm, 40-230 nm, 40-220 nm, 40-210 nm, 40-200 nm, 40-190 nm, 40-180 nm, 40-170 nm, 40-160 nm, 40-150 nm, 40-140 nm, 40-130 nm, 40-120 nm, 40-110 nm, 40-100 nm, 40-90 nm, 40-80 nm, 40-70 nm, 40-60 nm, 40-50 nm, 50-300 nm, 50-290 nm, 50-280 nm, 50-270 nm, 50-260 nm, 50-250 nm, 50-240 nm, 50-230 nm, 50-220 nm, 50-210 nm, 50-200 nm, 50-190 nm, 50-180 nm, 50-170 nm, 50-160 nm, 50-150 nm, 50-140 nm, 50-130 nm, 50-120 nm, 50-110 nm, 50-100 nm, 50-90 nm, 50-80 nm, 50-70 nm, 50-60 nm, 60-300 nm, 60-290 nm, 60-280 nm, 60-270 nm, 60-260 nm, 60-250 nm, 60-240 nm, 60-230 nm, 60-220 nm, 60-210 nm, 60-200 nm, 60-190 nm, 60-180 nm, 60-170 nm, 60-160 nm, 60-150 nm, 60-140 nm, 60-130 nm, 60-120 nm, 60-110 nm, 60-100 nm, 60-90 nm, 60-80 nm, 60-70 nm, 70-300 nm, 70-290 nm, 70-280 nm, 70-270 nm, 70-260 nm, 70-250 nm, 70-240 nm, 70-230 nm, 70-220 nm, 70-210 nm, 70-200 nm, 70-190 nm, 70-180 nm, 70-170 nm, 70-160 nm, 70-150 nm, 70-140 nm, 70-130 nm, 70-120 nm, 70-110 nm, 70-100 nm, 70-90 nm, 70-80 nm, 80-300 nm, 80-290 nm, 80-280 nm, 80-270 nm, 80-260 nm, 80-250 nm, 80-240 nm, 80-230 nm, 80-220 nm, 80-210 nm, 80-200 nm, 80-190 nm, 80-180 nm, 80-170 nm, 80-160 nm, 80-150 nm, 80-140 nm, 80-130 nm, 80-120 nm, 80-110 nm, 80-100 nm, 80-90 nm, 90-300 nm, 90-290 nm, 90-280 nm, 90-270 nm, 90-260 nm, 90-250 nm, 90-240 nm, 90-230 nm, 90-220 nm, 90-210 nm, 90-200 nm, 90-190 nm, 90-180 nm, 90-170 nm, 90-160 nm, 90-150 nm, 90-140 nm, 90-130 nm, 90-120 nm, 90-110 nm, 90-100 nm, 100-300 nm, 110-290 nm, 120-280 nm, 130-270 nm, 140-260 nm, 150-250 nm, 160-240 nm, 170-230 nm, 180-220 nm, or 190-210 nm.

In particularly preferred embodiments, the extracellular vesicle described herein has a longest dimension between about 30-100 nm. In another preferred embodiment, the extracellular vesicle has a longest dimension between about 20-300 nm. In another preferred embodiment, the extracellular vesicle has a longest dimension between about 40-200 nm. In another embodiment, a population of the extracellular vesicles described herein comprise a population wherein 90% of said extracellular vesicles have a longest dimension 20-300 nm. In another embodiment, a population of the extracellular vesicles described herein comprise a population wherein 95% of said extracellular vesicles have a longest dimension 20-300 nm. In another embodiment, a population of the extracellular vesicles described herein comprise a population wherein 99% of said extracellular vesicles have a longest dimension 20-300 nm. In another embodiment, a population of the extracellular vesicles described herein comprise a population wherein 90% of said extracellular vesicles have a longest dimension 40-200 nm. In another embodiment, a population of the extracellular vesicles described herein comprise a population wherein 95% of said extracellular vesicles have a longest dimension 40-200 nm. In another embodiment, a population of the extracellular vesicles described herein comprise a population wherein 99% of said extracellular vesicles have a longest dimension 40-200 nm. In other preferred embodiments, the size of the extracellular vesicles or population of extracellular vesicles described herein is measured according to methods described, infra.

In an embodiment, the average buoyant mass of the extracellular vesicles (pg/cell) is measured using a suspended microchannel resonator or a double suspended microchannel resonator (see e.g., Byun et al PNAS 2013 110(19):7580 and Bryan et al. Lab Chip 2014 14(3):569). In an embodiment, the dry density of the extracellular vesicles is measured by buoyant mass in an H2O-D20 exchange assay (see e.g., Feijo Delgado et al., PLOS One 2013 8(7):e67590). In some embodiments, the extracellular vesicles have an average membrane deformability fluctuation of standard deviation greater than 10, 20, 30, 40, 50, 60, 70, 80, 90, 100 or greater than 100 mrad as measured by spatial light interference microscopy (SLIM) (see e.g., Bhaduri et al., Sci Reports 2014, 4:6211). In an embodiment, the average membrane viscosity of a population of extracellular vesicles is measured by detecting the average fluorescence upon incubation with viscosity-dependent quantum yield fluorophores (see e.g., Haidekker et al. Chem & Biol 2001 8(2):123). In an embodiment, the membrane fluidity of the extracellular vesicles is measured by fluorescence polarization, e.g., with BMG Labtech POLARstar Omega microplate reader.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

The practice of the present invention will employ, unless otherwise indicated, conventional methods of protein chemistry, biochemistry, recombinant DNA techniques and pharmacology, within the skill of the art. Such techniques are explained fully in the literature. See, e.g., T.E. Creighton, *Proteins: Structures and Molecular Properties* (W. H. Freeman and Company, 1993); A. L. Lehninger, *Biochemistry* (Worth Publishers, Inc., current addition); Sambrook, et al., *Molecular Cloning: A Laboratory Manual* (2nd Edition, 1989); *Methods In Enzymology* (S. Colowick and N. Kaplan eds., Academic Press, Inc.); *Remington's Pharmaceutical Sciences*, 18th Edition (Easton, Pennsylvania: Mack Publishing Company, 1990); Carey and Sundberg *Advanced Organic Chemistry* $3^{rd}$ Ed. (Plenum Press) Vols A and B(1992).

Methods

Conditioned culture media is collected and centrifuged at 300-800×g for 5 minutes at room temperature to remove cells and large debris. Media supernatant is then supplemented with 1000 U/L benzonase and incubated at 37° C. for 1 hour in a water bath. Supernatant is collected and centrifuged at 16,000×g for 30 minutes at 4° C. to remove residual cell debris and other large contaminants. Supernatant is then ultracentrifuged at 133,900×g for 3 hours at 4° C. to pellet the exosomes. Supernatant is discarded and any residual media is aspirated from the bottom of the tube. The pellet is resuspended in 200-1000 μL PBS (—Ca —Mg).

To further enrich exosome populations, the pellet is processed via density gradient purification (sucrose or Optiprep™). For sucrose gradient purification, the exosome pellet is layered on top of a sucrose gradient as defined in Table 1 below:

TABLE 1

| Working Percentage (%) | 65% Stock Vol. (mL) | Milli-Q Vol. (mL) |
|---|---|---|
| 50 | 3.85 | 1.15 |
| 40 | 3.08 | 1.92 |
| 25 | 1.92 | 3.08 |
| 10 | 0.46 | 2.54 |

The gradient is spun at 200,000×g for 16 hours at 4° C. in a 12 mL Ultra-Clear (344059) tube placed in a SW 41 Ti rotor to separate the exosome fraction.

The exosome layer is gently removed from the top layer and diluted in ~32.5 mL PBS in a 38.5 mL Ultra-Clear (344058) tube and ultracentrifuged again at 133,900×g for 3 hours at 4° C. to pellet the purified exosomes. The resulting pellet is resuspended in a minimal volume of PBS (~200 μL) and stored at 4° C.

For Optiprep™ gradient, a 3-tier sterile gradient is prepared with equal volumes of 10%, 30%, and 45% Optiprep in a 12 mL Ultra-Clear (344059) tube for a SW 41 Ti rotor. The pellet is added to the Optiprep™ gradient and ultracentrifuged at 200,000×g for 16 hours at 4° C. to separate the exosome fraction. The exosome layer is then gently collected from the top ~3 mL of the tube.

The exosome fraction is diluted in ~32 mL PBS in a 38.5 mL Ultra-Clear (344058) tube and ultracentrifuged at 133,900×g for 3 hours at 4° C. to pellet the purified exosomes. The pelleted exosomes are then resuspended in a minimal volume of PBS (~200 μL) and store at 4° C.

For AlphaScreen™ assays, unconjugated acceptor beads, streptavidin donor beads, universal buffer, and ½ area 96-well white opaque plates were purchased from Perkin Elmer. Antibodies used were tetraspanin specific anti-human CD9 (clone HI9a) and biotinylated anti-human CD81 (clone 5A6) antibodies acquired from Biolegend. The CD9 antibodies were conjugated to acceptor beads following a protocol provided by Perkin Elmer. Sodium cyanoborohydride and O-(Carboxymethyl)hydroxylamine hemihydrochloride necessary for acceptor bead conjugation were purchased from Sigma-Aldrich.

All samples, bead, and antibody solutions were diluted in 1X dilution buffer to the needed concentration. A standard was created using Optiprep™ derived exosomes and serially diluted with universal buffer to create concentrations from 1E11 P/mL to 1.6E9 P/mL. Liquid chromatography exosomes samples were tested both neat and at 2× dilution.

In the half area plate, 10 uL of 1.5 nM biotinylated CD81 antibody, 10 uL of 50 ug/mL acceptor bead solution, and 5 uL of samples/standards were added to each well. The plate was then incubated in RT for 1 hour. Following incubation, 25 uL of a 80 ug/mL solution of streptavidin donor bead solution were added and incubated in the dark for 1 hour. Finally, using an Alpha-capable BMG CLARIOstar plate reader, the samples were read with an excitation of 680 nm and emission band-range of 520-620 nm.

For affinity size-exclusion chromatography (SEC) assays, exosome or exosome-antibody complex samples were analyzed on an Acclaim 1000A 7.8×150 mm column run at 0.3 mL/min. Mobile phase solution was 0.1M Na Phosphate, 0.2M NaCl, pH 7.2, and samples were injected at $2\times10^{11}$ particles/mL+/−170 ng anti-CD81_FITC antibody in 100 μL final volume.

Example 1

Figure 1B:
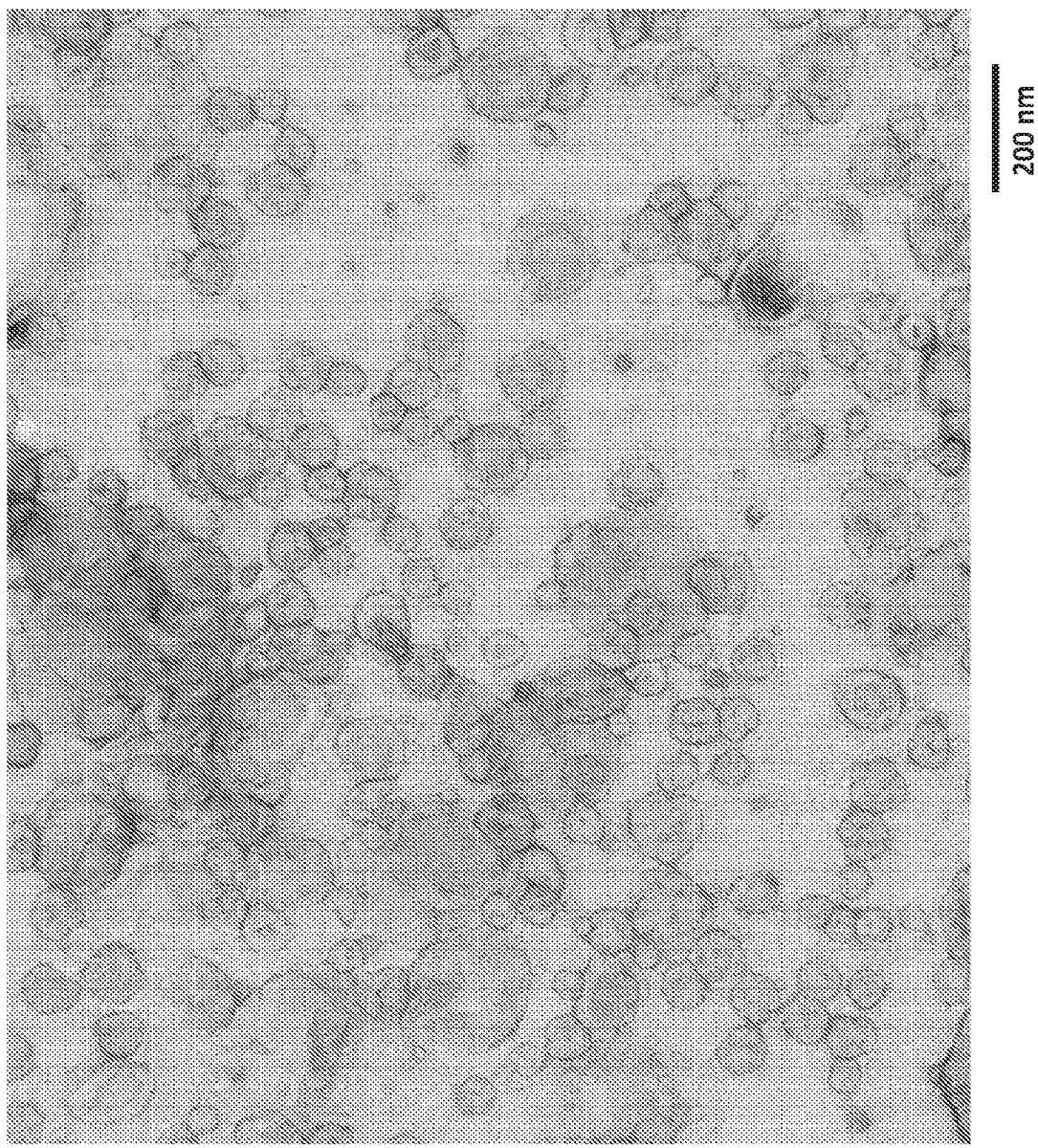
FIG. 1B is a representative transmission electron micrograph of the Optiprep™ purified exosome stock.

Strong Anion Exchange Chromatography Profiles of Purified Exosomes and Cell Culture Harvest at Different Excitation and Emmission Spectra To understand fundamental properties of exosomes and develop analytical tools for studying exosomes, Optiprep™ purified exosome preparations and cell culture harvest were analyzed by strong anion exchange chromatography (AEX). Exosomes from HEK293 SF cells grown in serum-free conditions were processed as described in the methods above. For cell culture harvest, HEK293 SF cells were grown in serum-free medium, and 600 ml of supernatant were collected. Cell culture harvest was then centrifuged at 1600 g for 10 minutes and filtered through a 0.8 μm filter to remove cellular debris before chromatographic analysis. AEX was monitored at 210, 254, and 280 nm and was performed using a CIMac monolithic QA-1mL column from BIA Separations. The Optiprep™ purified exosome stock concentration was measured to be $4\times10^{12}$ particles/mL by nanoparticle tracking assay (NTA), and the sample was diluted 100-fold prior to injection. As shown in FIG. 1A, purified exosomes were detected in a strong peak at about 8.5 minutes using a detector set at 254 nm (a similar profile was observed for all wavelengths monitored). Cell culture harvest containing a heterogeneous population of particles including exosomes displayed a broad peak at the same elution time point, but also displayed a significantly more heterogeneous elution profile. Optiprep™ purified exosomes were analyzed by transmission electron microscopy (FIG. 1B) to verify their expected shape and size.

Figure 2:
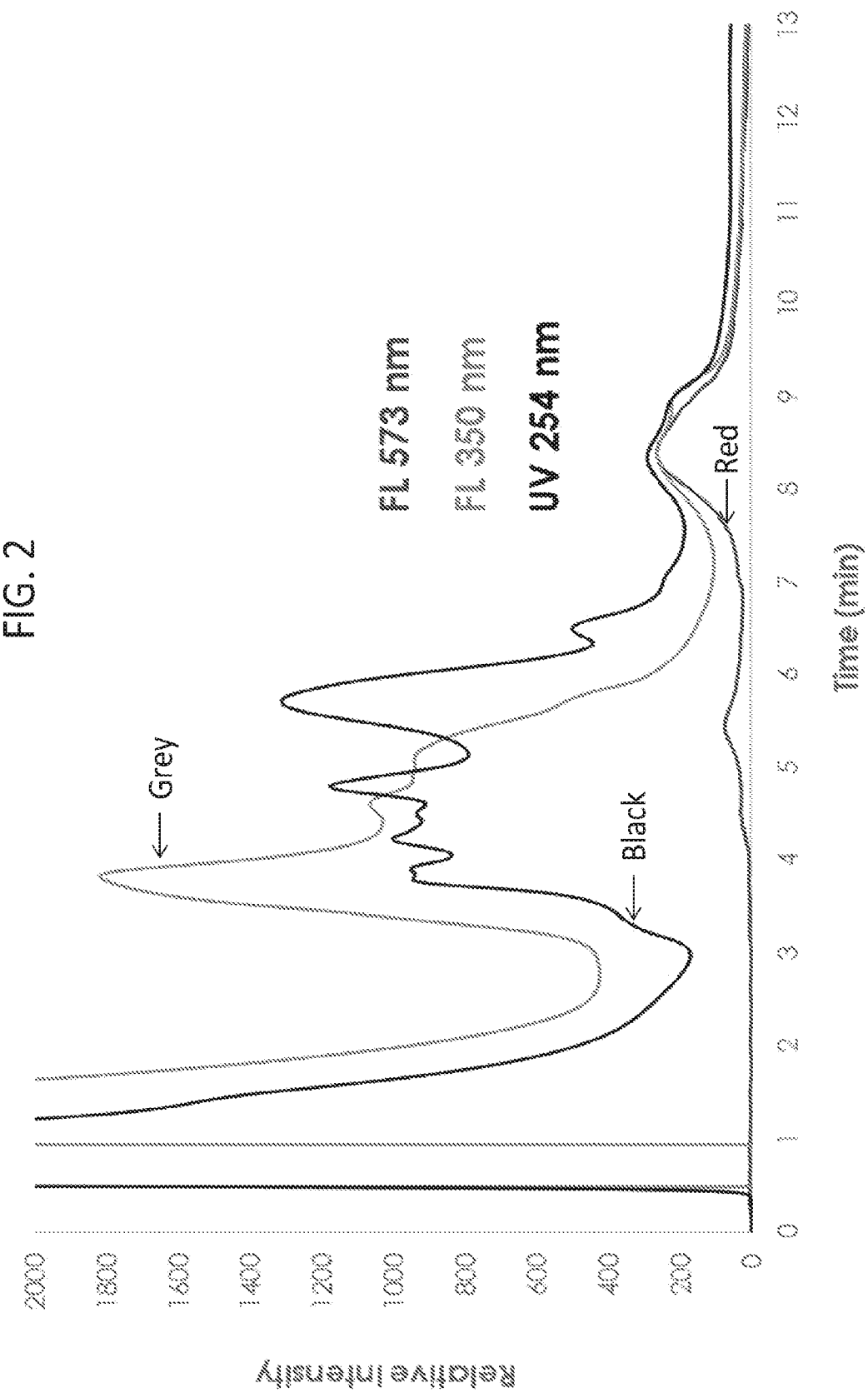
FIG. 2 is a representative comparison of the spectral profiles from AEX of HEK293 SF cell harvest. AEX was monitored with both absorbance (254 nm, black trace) and fluorescence detectors. Fluorescence was monitored with two different excitation (ex) and emission (em) wavelengths; ex: 280 nm, em: 350 nm (grey trace) and ex: 556 nm, em: 573 nm (red trace).

To explore whether the exosomes contained within raw cell culture harvest could be detected by AEX, HEK293 SF culture supernatant was processed and analyzed by AEX as described above and monitored at various spectral settings (FIG. 2). The samples were monitored by UV absorbance at 254 nm, and by two separate fluorescence methods. The first fluorescence method used an excitation wavelength (ex) of 280 nm and emission wavelength (em) of 350 nm, which pertains to intrinsic protein fluorescence. The second fluorescence method used an ex of 556 nm and an em of 573 nm. While all three spectral traces showed a peak corresponding to exosomes at the expected 8.5 minute time point, only ex556/em573 showed a spectral trace with this peak as the dominant species. This result suggests that exosomes within a heterogeneous cell culture harvest milieu can be detected above background using a simple and rapid AEX method.

Figure 3:
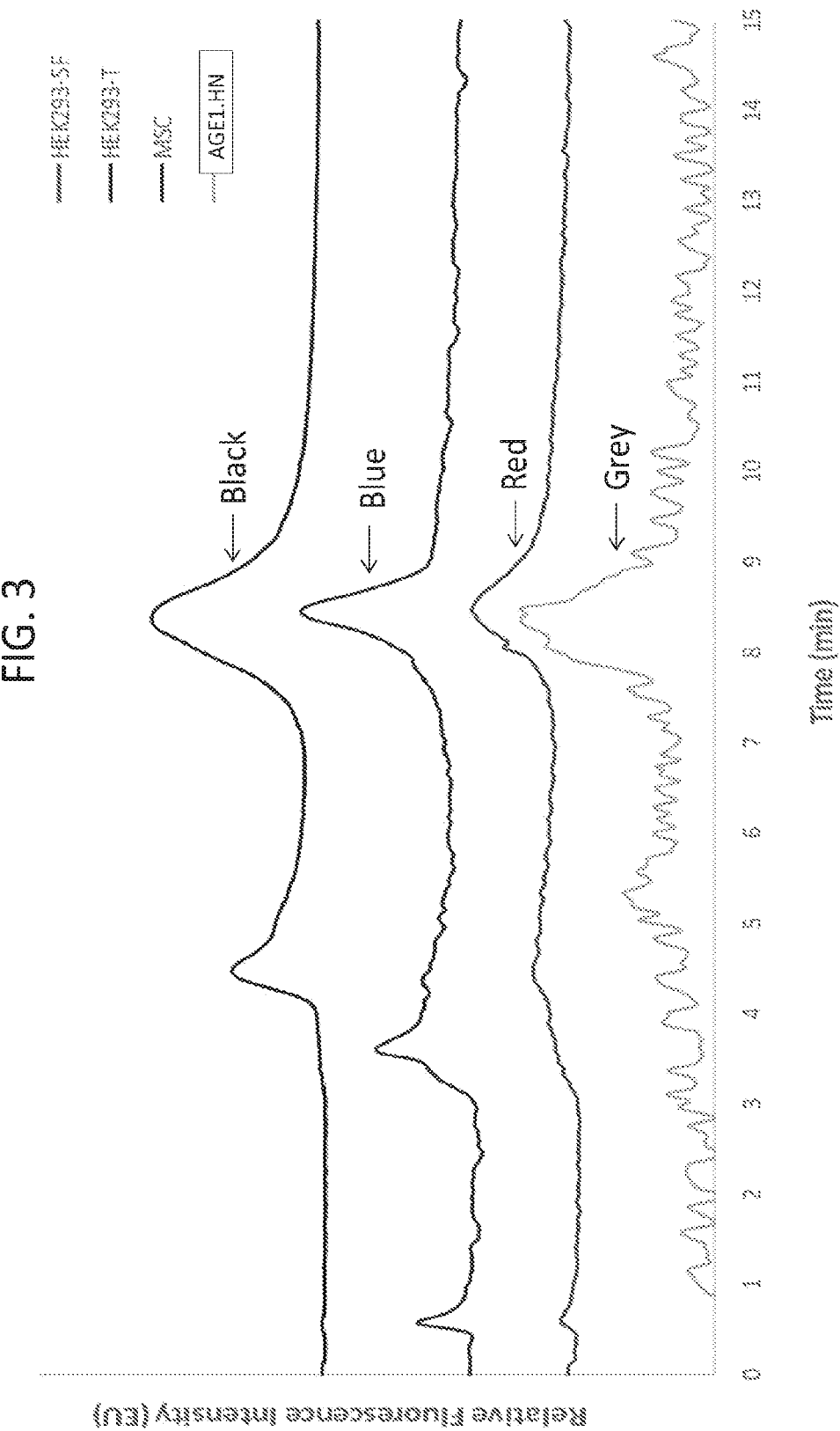
FIG. 3 is a comparison of the fluorescence profiles (ex: 556 nm, em: 573 nm) of density gradient purified exosomes from four different cell lines: HEK293SF (red trace), HEK293T (black trace), mesenchymal stem cells (blue trace), and AGE1.HN (grey trace).

To confirm that the peak detected by AEX at ex556/em573 shown in FIG. 2 corresponded to exosomes, Optiprep™ purified exosome preparations resuspended in PBS from four different cell types were analyzed using this method. As shown in FIG. 3, exosomes from HEK293SF cells, HEK293T cells, mesenchymal stem cells, and the human neuronal precursor cell line AGE1.HN were examined. Importantly, all four of the exosome preparations displayed the same spectral behavior with a discrete peak at 8.5 minutes when analyzed by AEX at ex556/em573. Together, these data suggest that there is an intrinsic fluorescence signature for exosomes, and that this signature can be detected in purified exosome populations, or in raw cell culture harvest.

Example 2

Figure 4A:
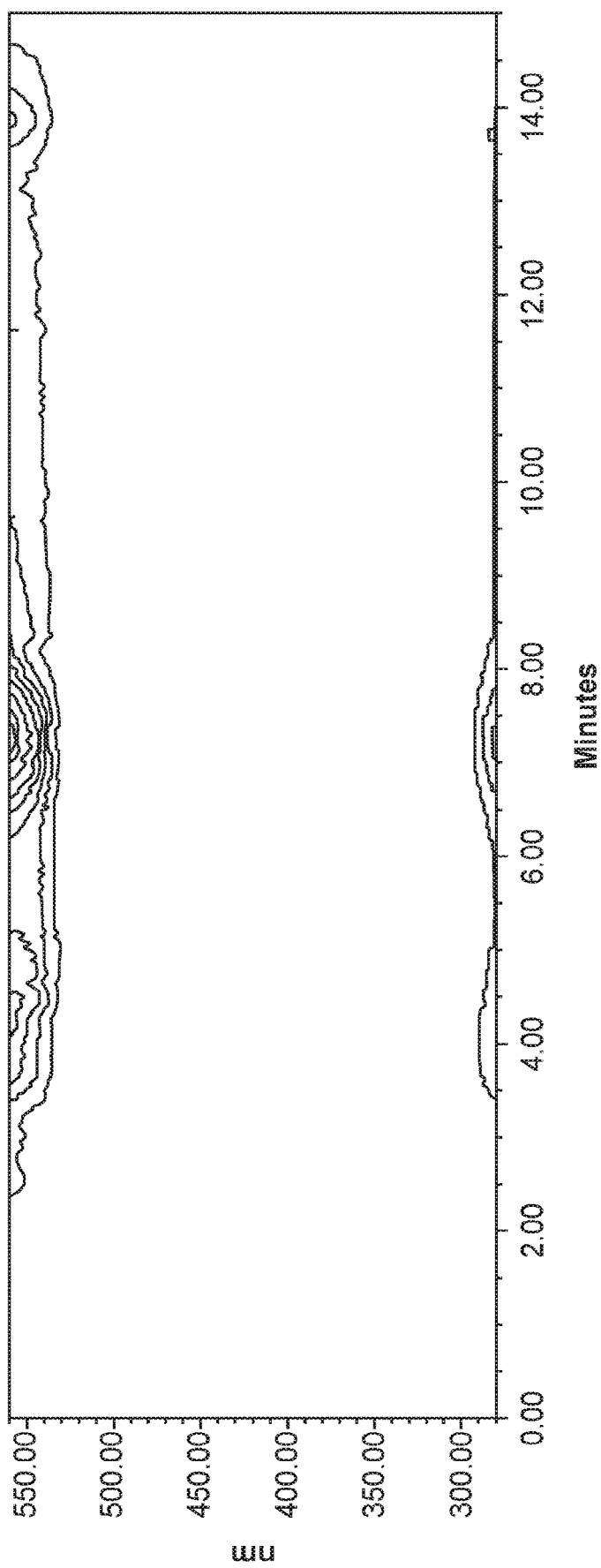
FIG. 4A illustrates optimal fluorescent excitation wavelengths for detection of Optiprep™ purified exosomes. The emission wavelength was held constant at 573 nm and the excitation wavelength was scanned from 280 to 560 nm.
Figure 4B:
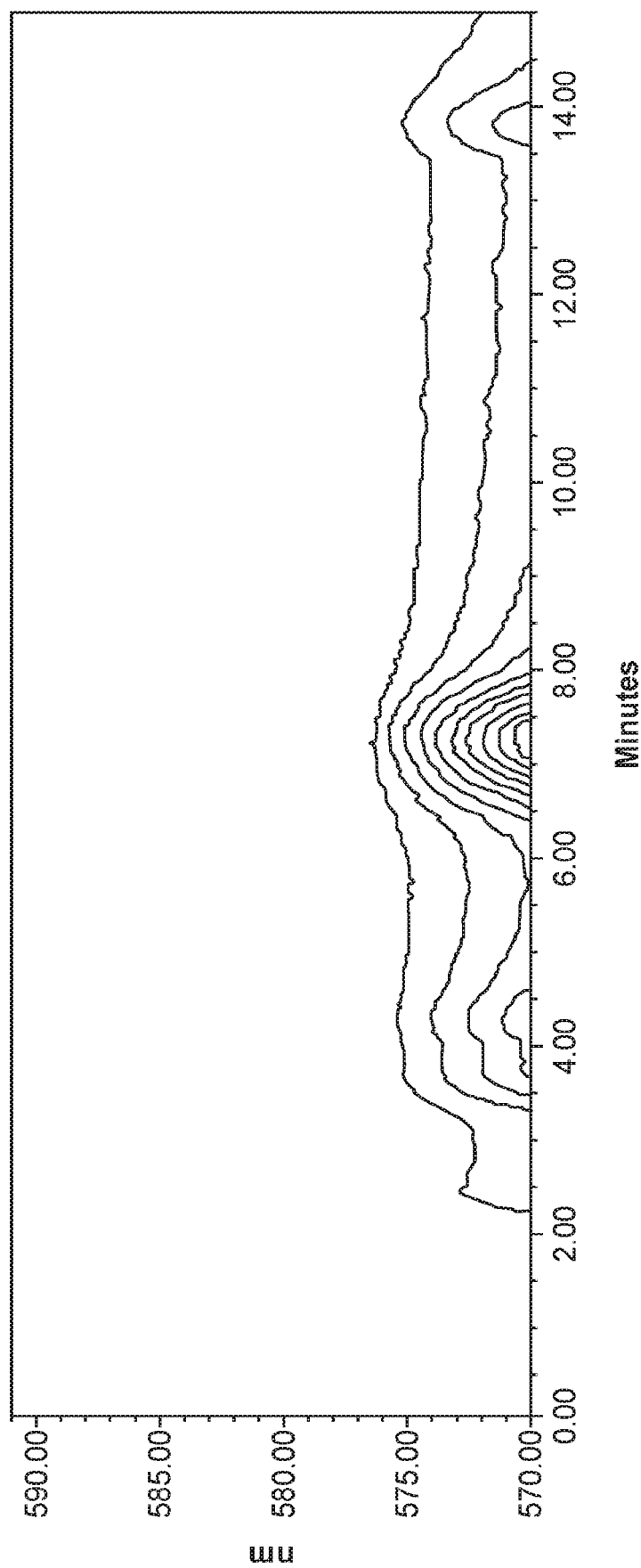
FIG. 4B illustrates optimal fluorescent excitation wavelengths for detection of Optiprep™ purified exosomes. The excitation wavelength was held constant at 556 nm and the emission wavelength was scanned from 570 to 700 nm.

Determining the Optimal Fluorescence Spectrum for Analyzing AEX-Purified Exosomes To optimize the excitation and emission wavelengths for the detection of exosomes, wavelength scanning on Optiprep™ purified exosomes was carried out. To determine the optimal excitation wavelength, Optiprep™ purified exosomes were analyzed by AEX, while the emission wavelength was held constant at 573 nm, and the excitation wavelength was scanned from 280 nm to 560 nm (FIG. 4A). To determine the optimal emission wavelength, Optiprep™ purified exosomes were analyzed by AEX, while the excitation wavelength was held constant at 556 nm, and the emission wavelength was scanned from 570 nm to 770 nm (FIG. 4B). These results indicate that the optimal wavelengths for detecting intrinsic fluorescence of exosomes is an excitation wavelength of 556 nm and emission wavelength of 573 nm.

Example 3

Synthetic Liposomes and Cell-Derived Exosomes do not have the Same Fluorescence Spectra To determine if the fluorescence profile determined in Example 1 was specific to cell-derived exosomes, synthetic liposomes were also analyzed by AEX at ex556/em573. Synthetic clodronate liposome controls formulated in PBS were purchased. The liposomes were composed of a mixture of phosphatidylcholine and cholesterol and formulated to be between 0.15 -3 μm in size. Before analysis, the liposomes were filtered through a 0.45 μm cellulose acetate filter to remove the larger sized liposomes. The resulting filtered liposomes were analyzed by NTA (FIG. 5A) and transmission electron microscopy (FIG. 5B) confirming that they are similar in size and shape to cell-derived exosomes (see FIG. 1B).

Figure 5A:
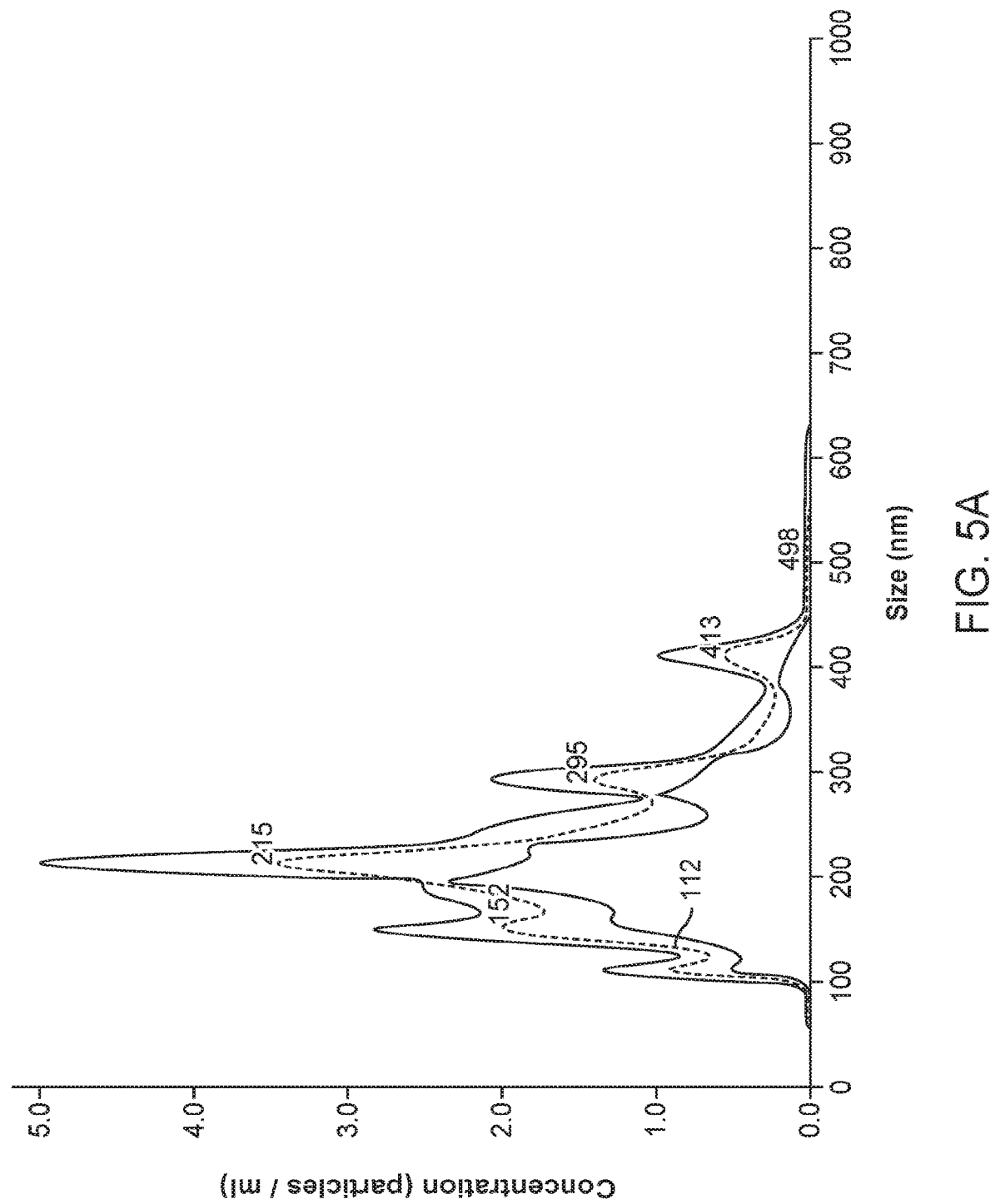
FIG. 5A illustrates characterization of clodronate liposome control samples. Nanoparticle tracking analysis (NTA) analysis of clodronate liposomes after filtering through a 0.45 μm filter is shown.
Figure 5B:
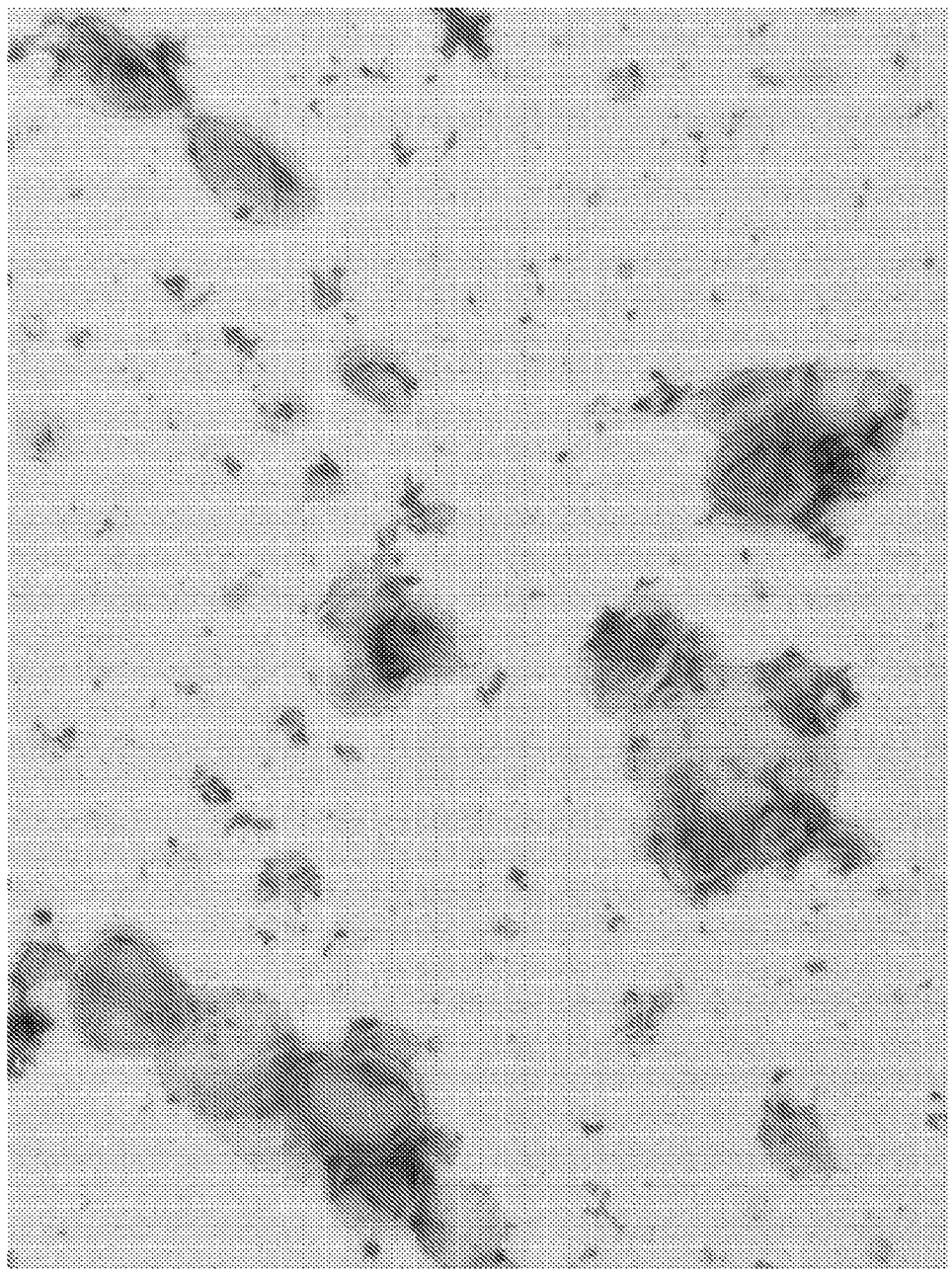
FIG. 5B shows a representative transmission electron micrograph of filtered clodronate liposomes.
Figure 6:
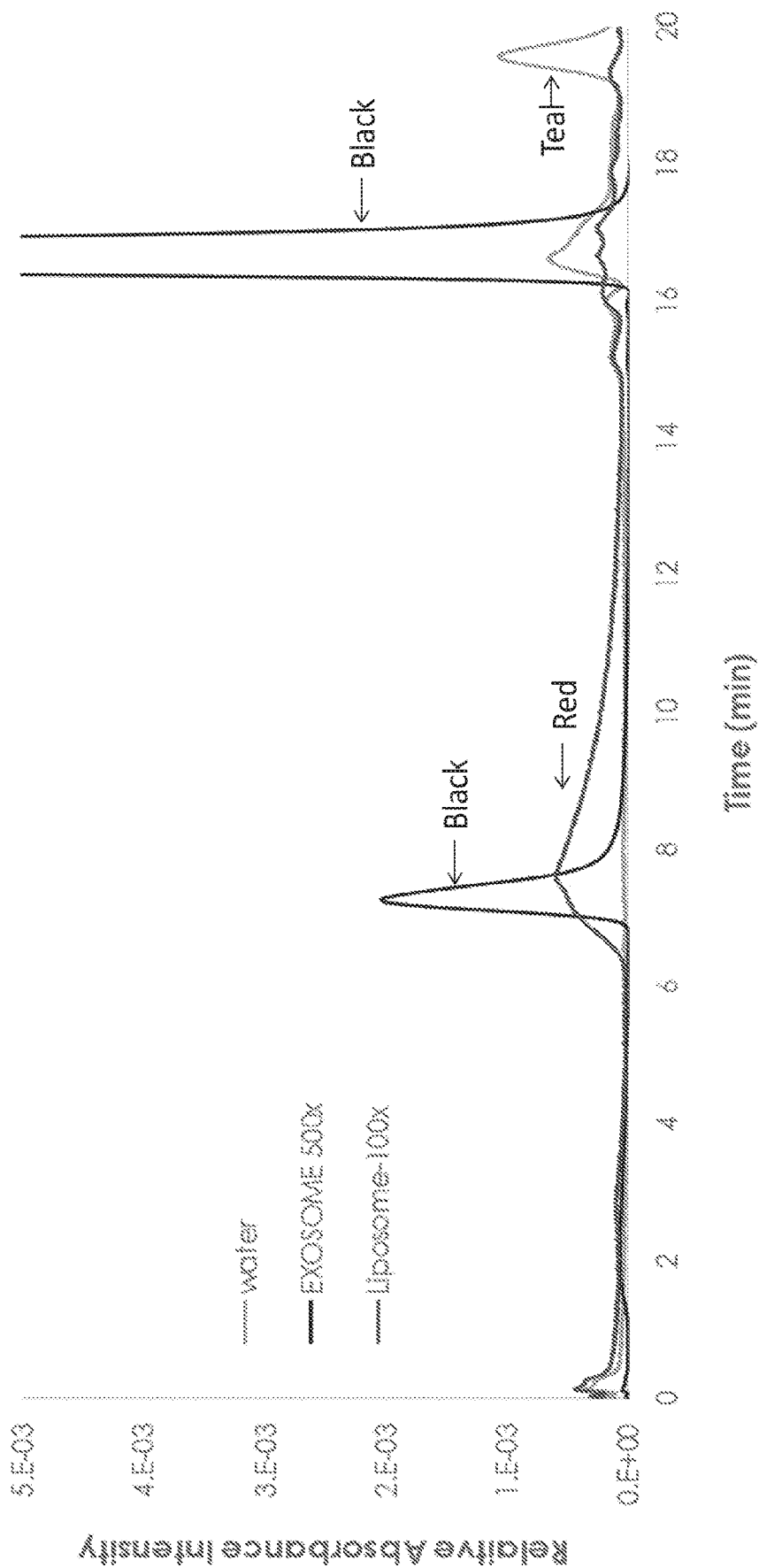
FIG. 6 shows size-exclusion chromatography (SEC) analysis of liposome and exosome samples monitored by UV at 254 nm. Optiprep™ purified exosome samples (black trace) elute in the column's void volume ($V_o$) at approximately 7.5 min. The buffer (teal trace) shows no interference and the liposome sample (red trace) shows a broad elution profile.

To confirm that the synthetic liposomes had similar size-dependent characteristics of cell-derived exosomes, both populations were analyzed by size-exclusion chromatography (SEC) and monitored by UV absorbance. As shown in FIG. 6, liposomes and Optiprep™ purified exosomes were suspended in PBS, and SEC separation was performed using a Tosoh Biosciences G4000SW$_{XL}$ 7.8 mm×30 cm column operated at 0.8 mL/min. Optiprep™ purified exosome samples (black trace) eluted in the void volume at approximately 7.5 minutes. The buffer (teal trace) showed no interference, and the liposome sample (red trace) showed a broad elution profile peaking near 8 minutes, which is consistent with the large particle size distribution from NTA (FIG. 5A). The peaks at approximately 17 minutes corresponded to one column volume. These data demonstrate that purified liposomes and Optiprep™ purified exosomes have similar elution profiles, presumably due to their similar size and lipid composition.

Figure 7:
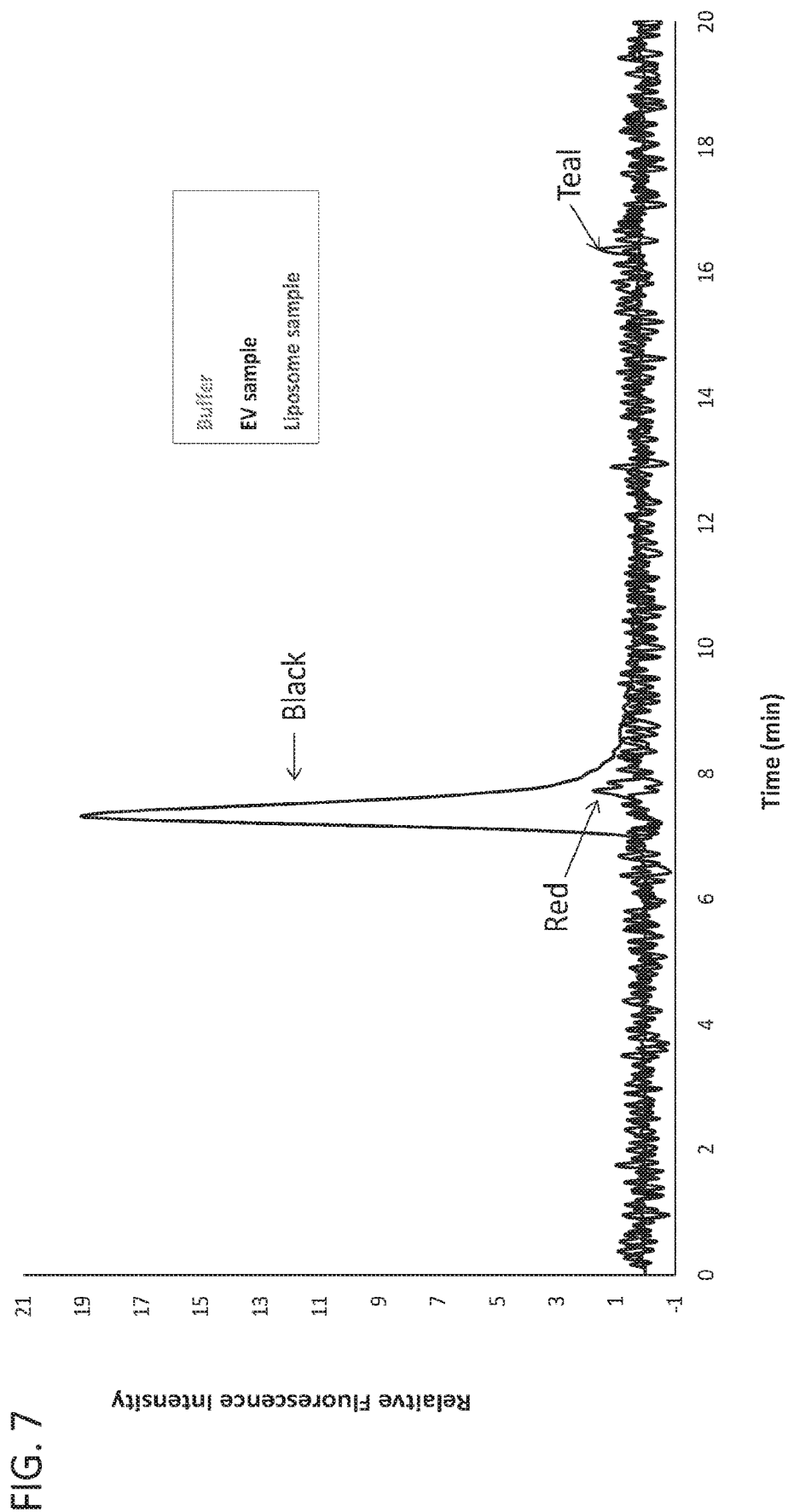
FIG. 7 shows representative SEC profiles of buffer (teal trace), exosome (black trace), and liposome (red trace) samples with fluorescent detection at ex: 556 nm and em: 573 nm.

To determine whether the purified liposomes described above also have an intrinsic fluorescence profile, the samples from FIG. 6 were analyzed by AEX at ex556/em573. Surprisingly, only the Optiprep™ purified exosomes (black trace) showed the expected peak at about 8 minutes (FIG. 7; see also FIG. 3) while neither the purified liposomes (red trace) nor a buffer sample (teal trace) could be detected using this method. These results clearly demonstrate that the fluorescence spectra determined by AEX at ex556/em573 is specific to cell-derived exosomes, and not all lipid-based vesicles.

Example 4

AEX at ex556/em573 is Useful for Determining Exosome Concentration and Number

Figure 8A:
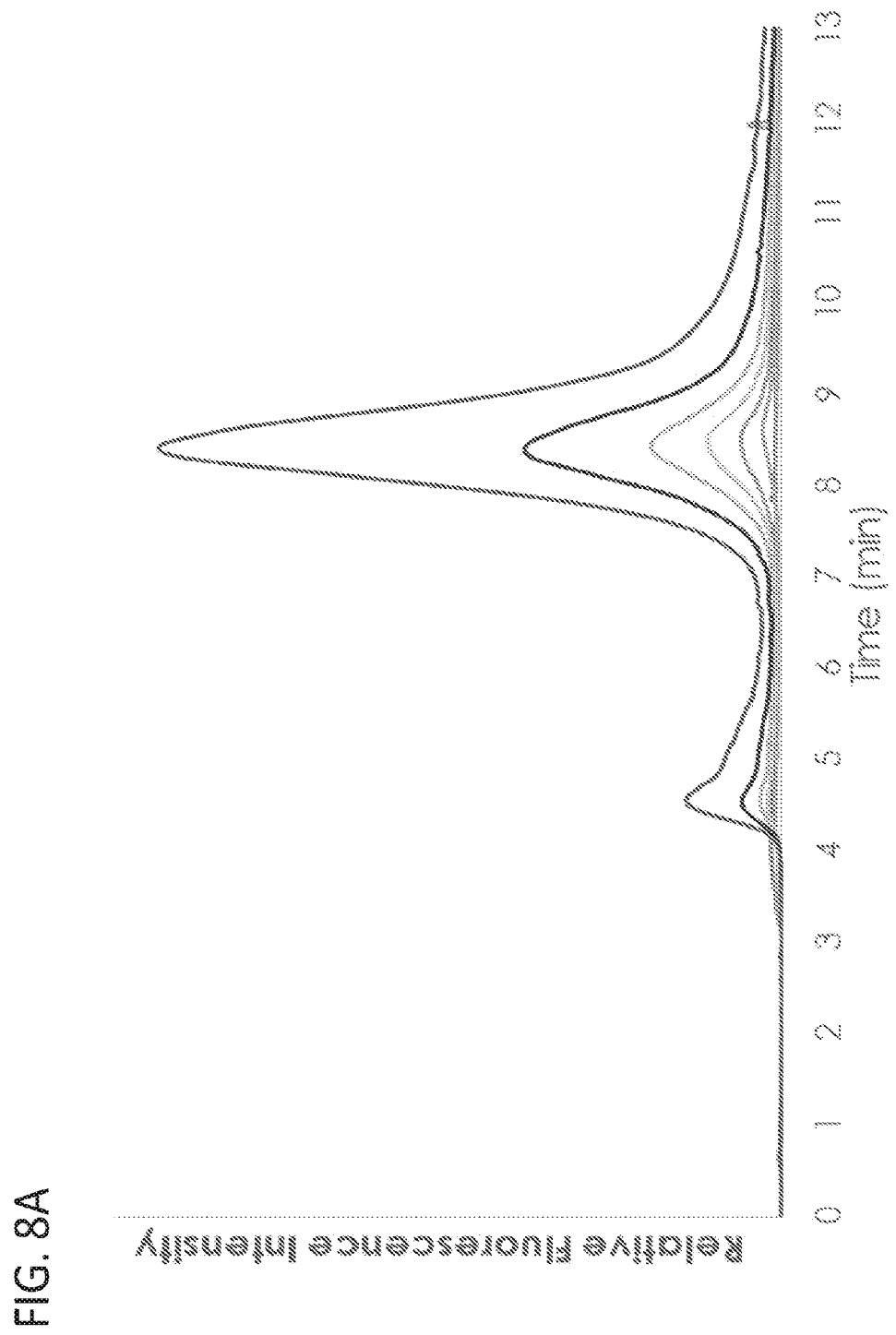
FIG. 8A shows the quantitation of exosomes by intrinsic exosome fluorescence. Exosome stock sample was generated from HEK293 SF cells and purified by Optiprep™ density gradient. Representative fluorescent traces of the serial dilutions of exosome stock are shown.
Figure 8B:
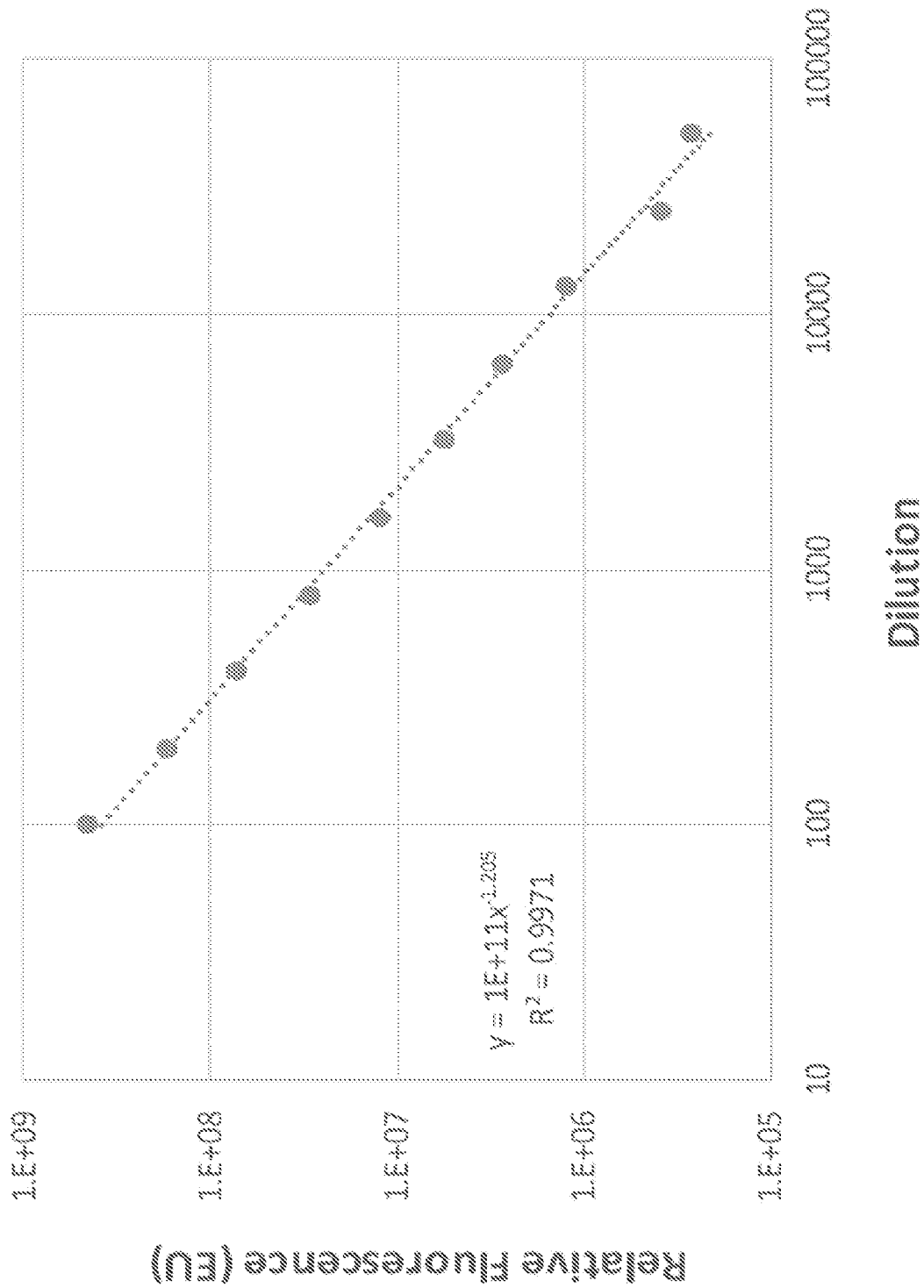
FIG. 8B shows a linearity trace of the EV fluorescent peak area versus dilution from stock.
Figure 8C:
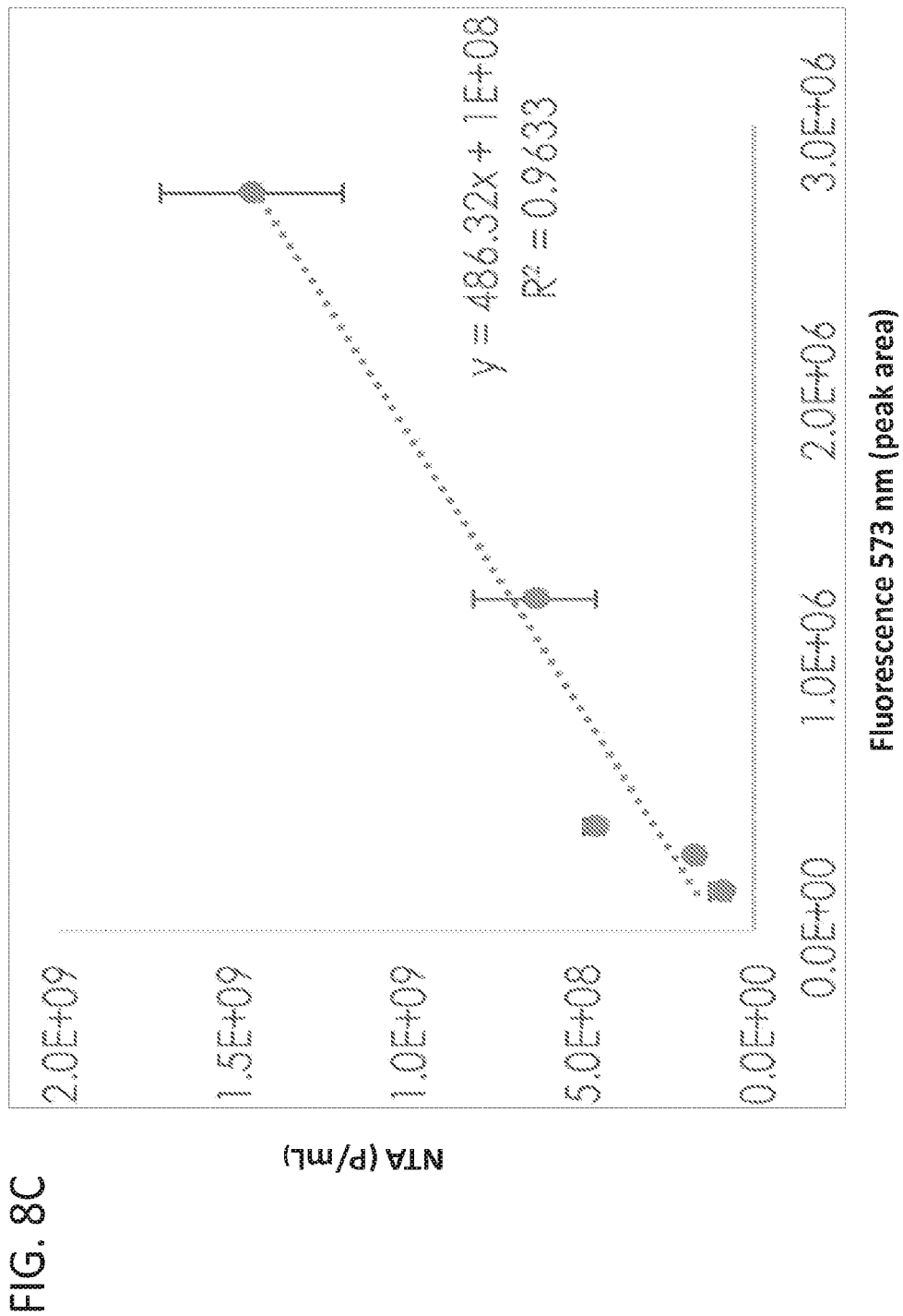
FIG. 8C illustrates serial dilutions analyzed by NTA and compared against the fluorescent peak area.

To explore the performance characteristics of AEX at ex556/em573, exosomes at a range of concentrations were analyzed according to this method. Optiprep™ purified exosomes from HEK293SF cells were purified as described above to a concentration of $4\times10^{12}$ particles/ml as determined by NTA. The stock sample was serially diluted into HEK293SF culture harvest and analyzed by AEX at ex556/em573 as described above. As shown in FIG. 8A, serially diluted exosome preparations could be differentially detected. Relative fluorescence, as measured by the area under the curve of the spectral plot, was linearly correlated with the exosome dilution series (FIG. 8B). Additionally, particle number of the dilution series was linearly correlated with the fluorescence peak area (FIG. 8C). Together, these results indicate that AEX at ex556/em573 can quantitatively measure exosome concentration and raw particle count, even when diluted many orders of magnitude into heterogenous cell culture supernatant.

Example 5

Figure 9:
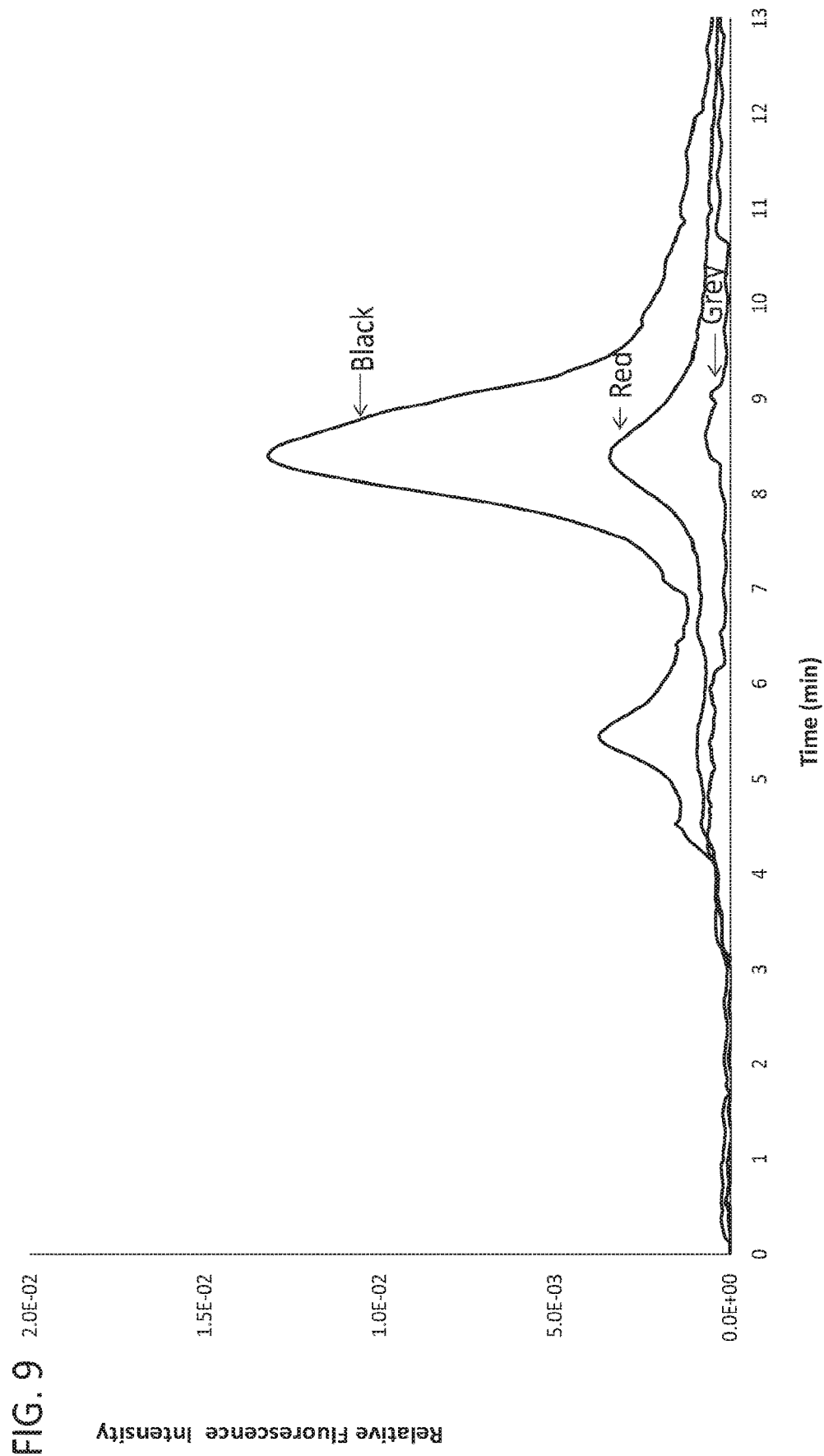
FIG. 9 shows AEX fluorescence traces of cell culture media blank (grey trace) and a representative high (black trace) and low (red trace) cell culture yield process from HEK293SF cells.

AEX at ex556/em573 can be used to Semi-Quantitatively Measure Exosome Yield in Cell Culture Harvest To determine if AEX at ex556/em573 can be used to directly measure exosome levels in cell culture harvest, various samples from HEK293 SF culture medium were analyzed. As shown in FIG. 9, cell culture blank media (grey trace) was not detectable, while cell culture harvest from a low yield culture (red trace) was detected at a lower peak fluorescence than cell culture harvest from a high yield culture (black trace). These results demonstrate that a rapid, single-step AEX method can semi-quantitatively differentiate exosome yield directly from cell culture harvests grown under different conditions.

Example 6

Figure 10:
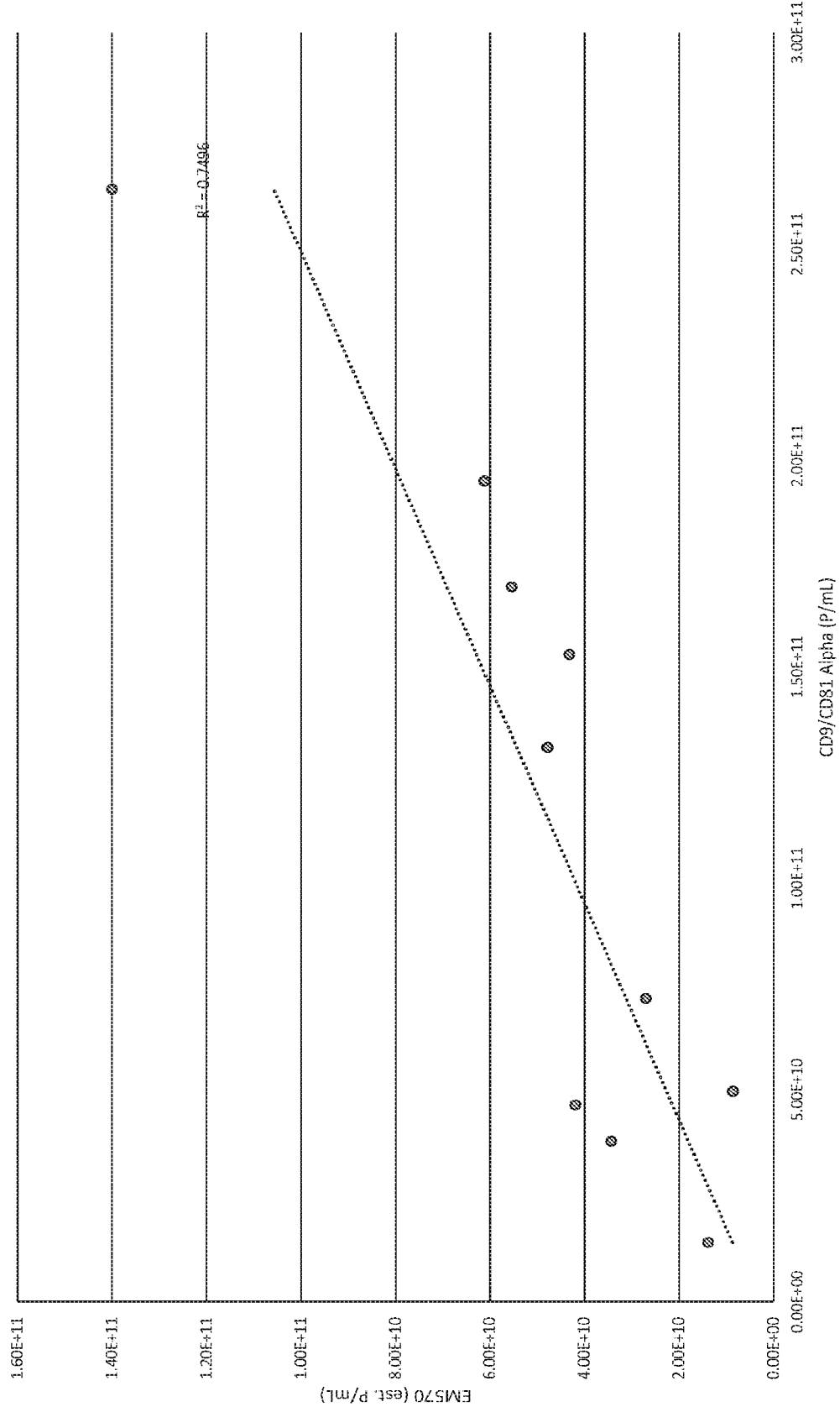
FIG. 10 shows the correlation between exosome quantity as measured by fluorescence detection at ex: 556 nm and em: 573 nm and AlphaScreen™ using antibodies against CD9 and CD81.

Exosomes Quantited by Intrinsic Fluorescence Correlate with AlphaScreen™ Quantitation To validate that the exosome quantitation methods using intrinsic fluorescence are accurate, the yield estimates were compared to exosome amounts as measured by AlphaScreen™. As shown in FIG. 10, estimated exosome yield determined by AEX ex556/em573 correlates well with exosome yield determined by exosome CD9/CD81 AlphaScreen™. The agreement between these orthogonal methods suggests that the absolute exosome yield determined by ex556/em573 is accurate.

Example 7

Two-Dimensional Liquid Chromatography Improves Exosome Detection and Purity

Figure 11:
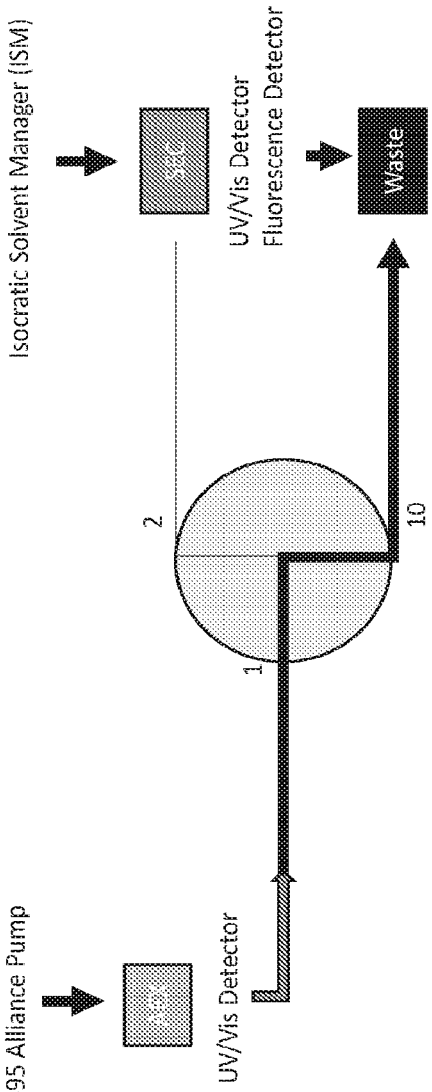
FIG. 11 shows a schematic for two-dimensional liquid chromatography.
Figure 11:
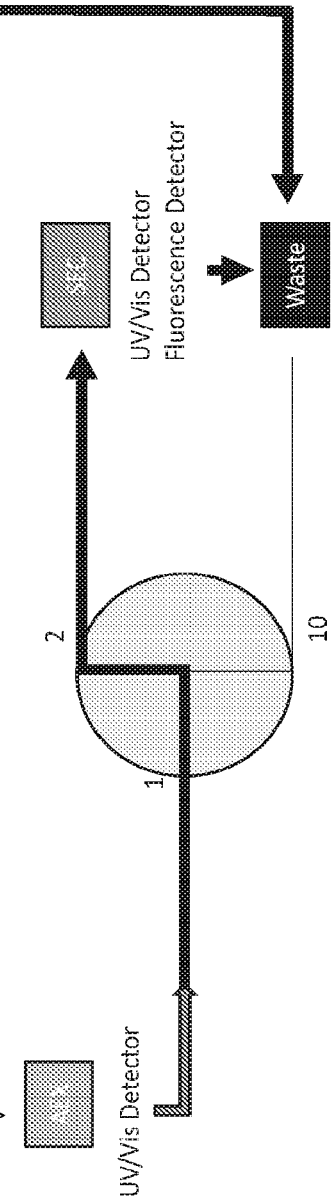
Figure 12:
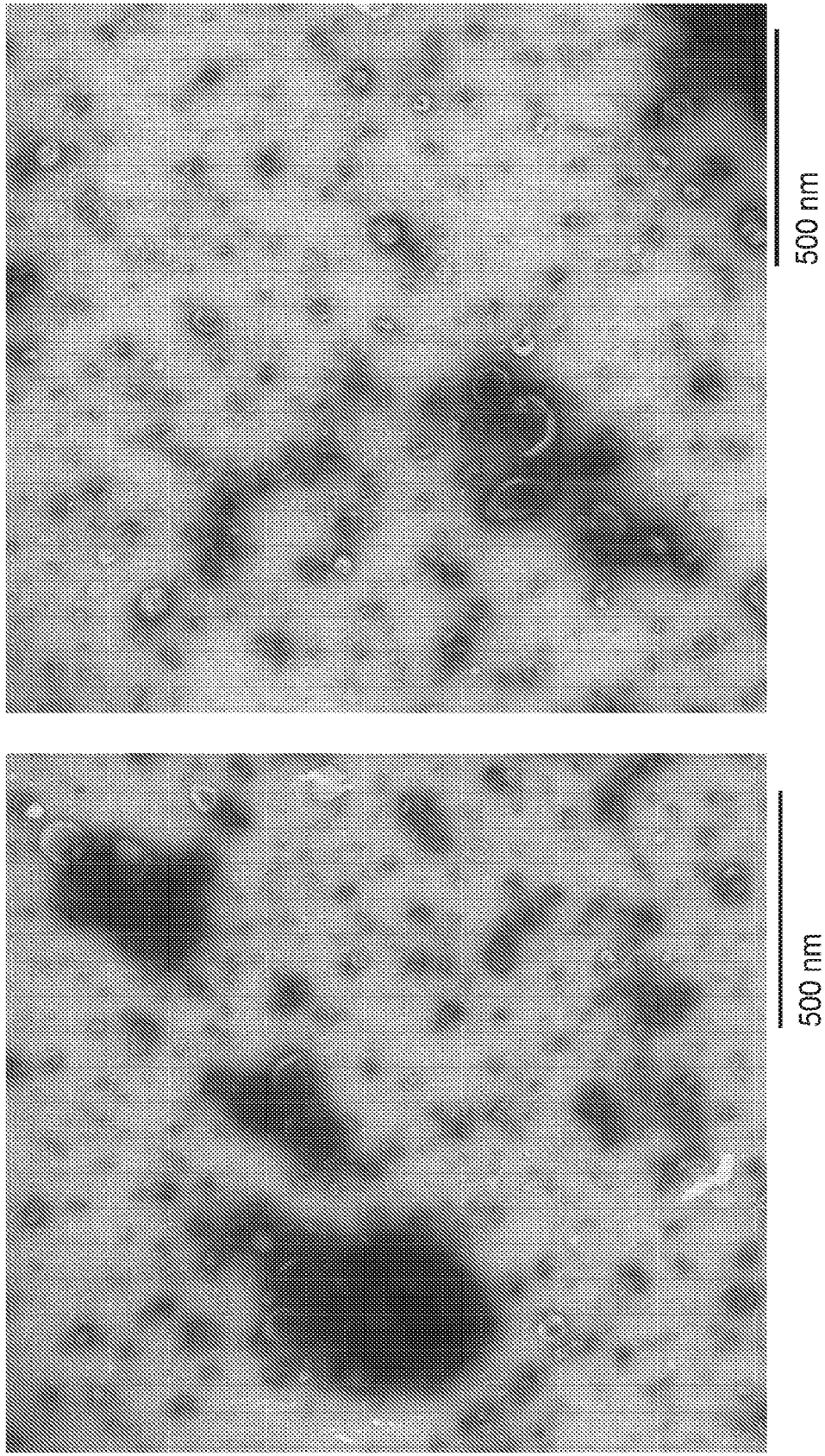
FIG. 12 is a representative transmission electron micrograph of exosomes purified by anion-exchange chromatography or anion-exchange chromatography followed by size-exclusion chromatography.
Figure 12:
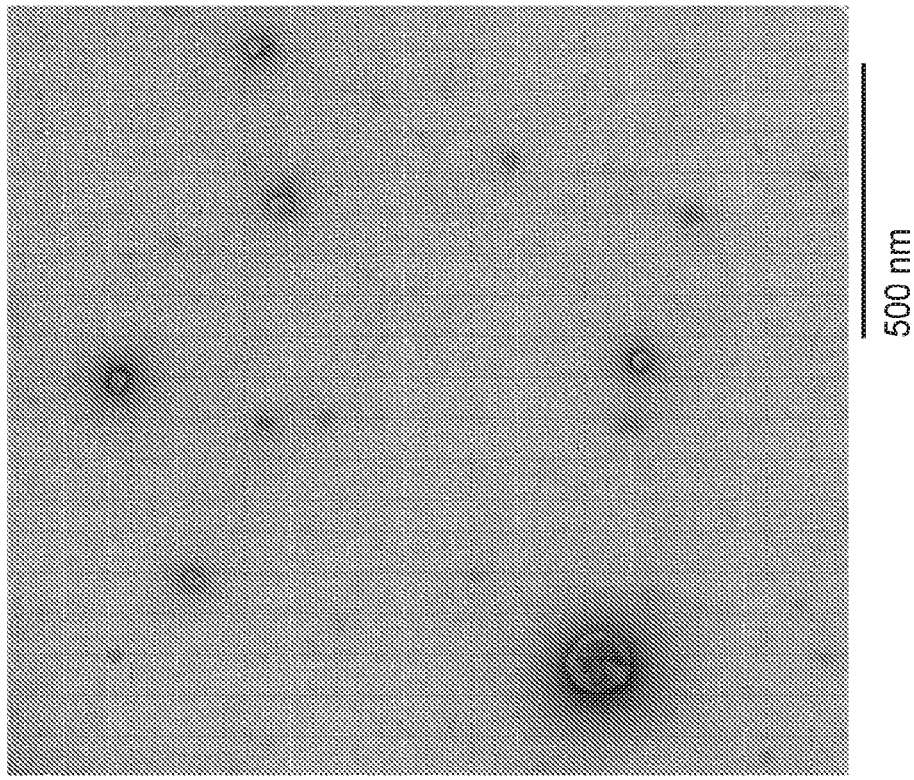
Figure 12:
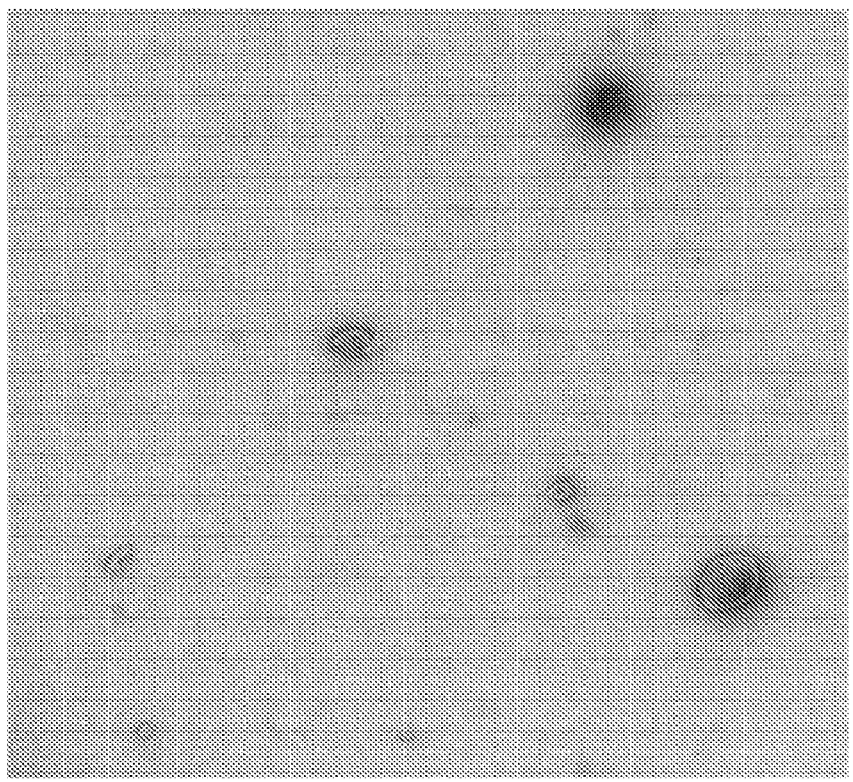

To further improve the ability to detect exosomes from cell culture harvest, a two-dimensional liquid chromatography (2D-LC) method was established, 2D-LC SEC ex556/em573 (FIG. 11). This method applies an exosome sample to an AEX column where total protein is analyzed by a UV/visual light detector. The peak fraction that contains exosomes is then applied to an SEC column and analyzed by ex556/em573. Exosomes that were analyzed by 2D-LC SEC ex556/em573 had higher purity than exosomes analyzed by AEX alone as judged by electron microscopy. (FIG. 12).

Figure 13A:
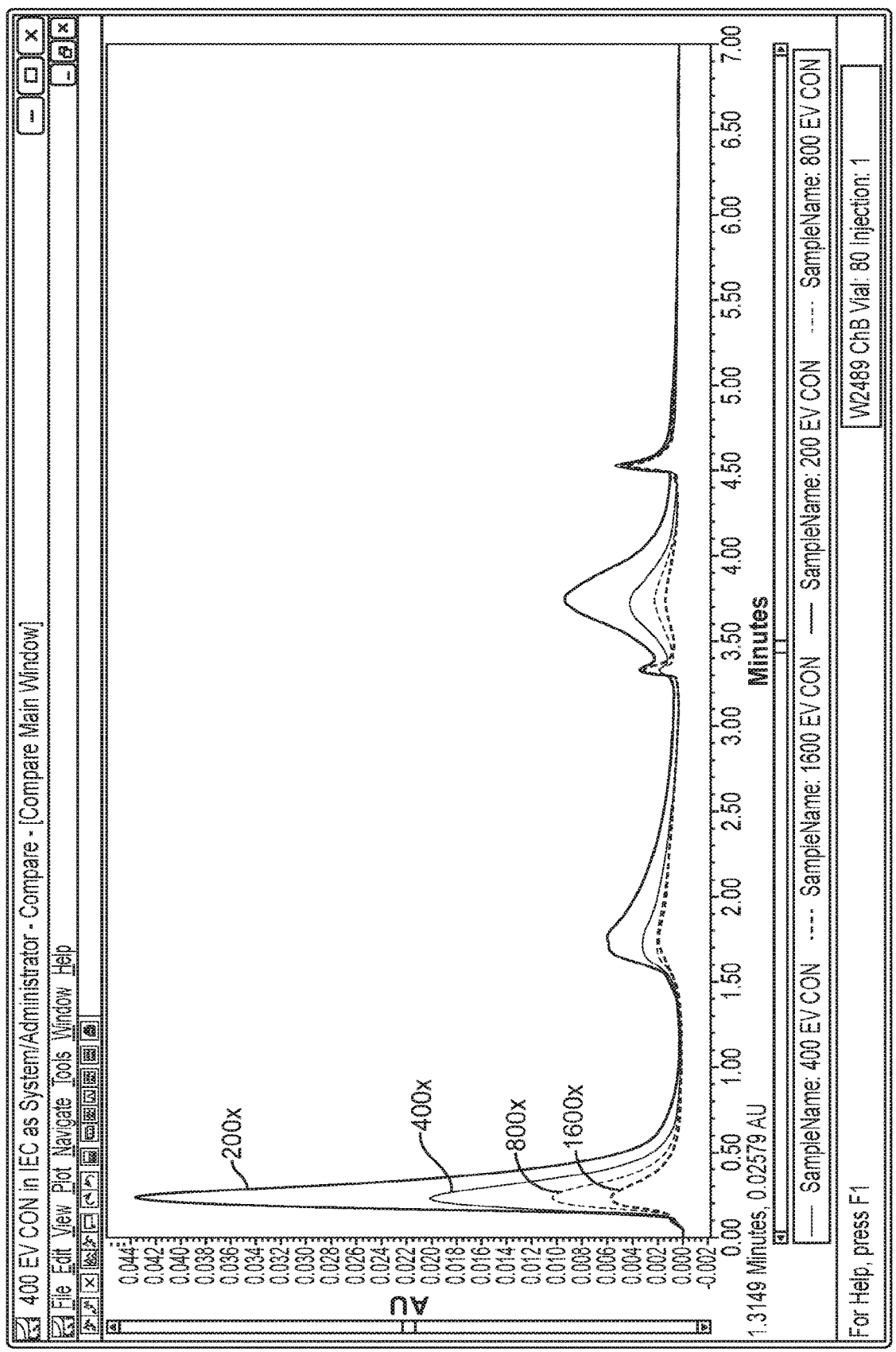
FIG. 13A is a chromatogram of a dilution series of Optiprep™-purified exosomes analyzed by AEX at 280 UV/visual detection at 200×, 400×, 800× or 1600× dilution.
Figure 13B:
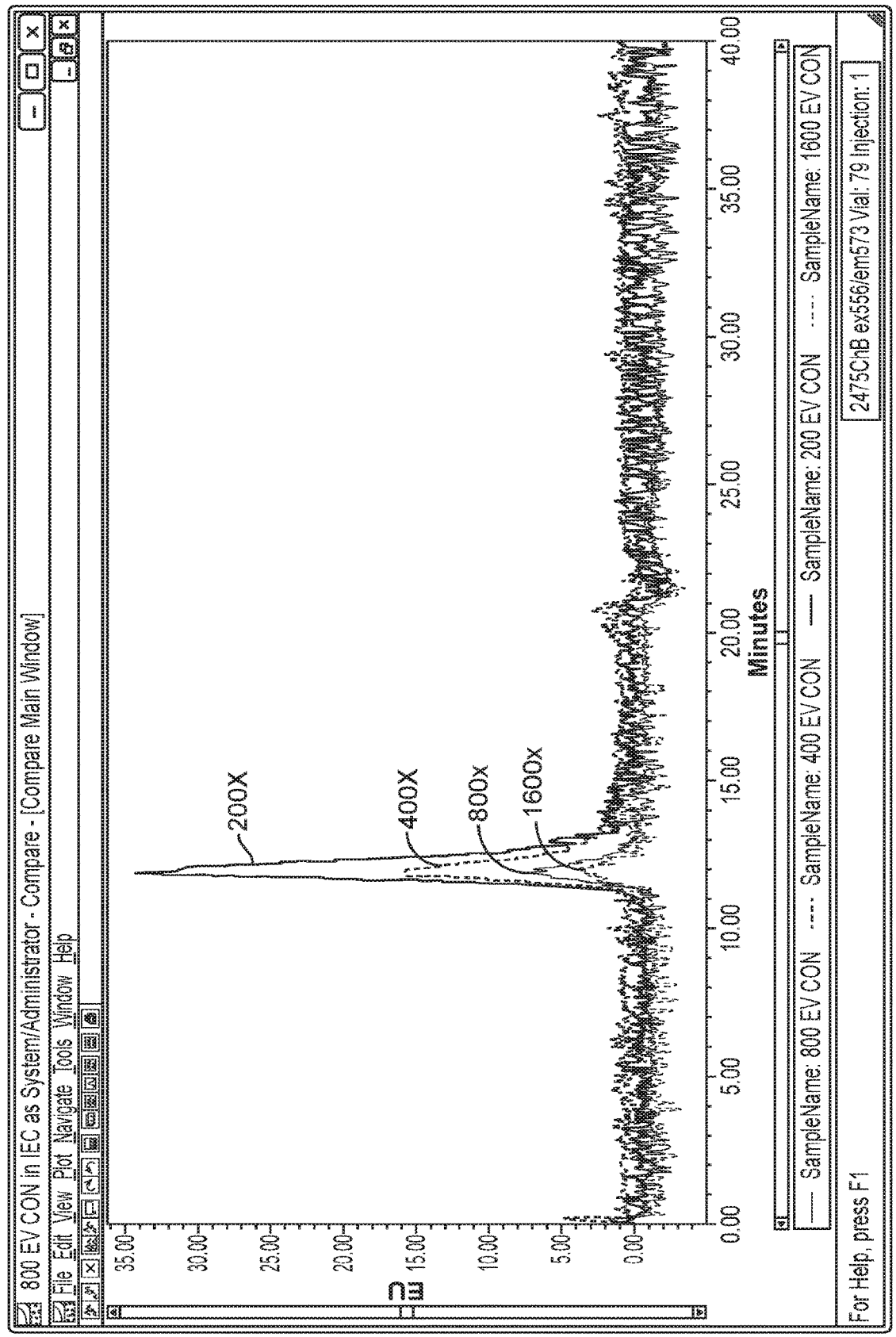
FIG. 13B is a chromatogram of a dilution series of Optiprep™-purified exosomes analyzed by SEC at ex: 556 nm and em: 573 nm at 200×, 400×, 800× or 1600× dilution.

To determine whether 2D-LC could accurately quantitate exosome titers, Optiprep™-purified exosomes were spiked into PBS at dilutions of 200× to 1600×. After AEX alone, the exosomes were detected as a minor species at ~3.5 minutes. After 2D-LC SEC ex556/em573, the exosomes were detected as the only signal by ex556/573 in a concentration-dependent manner (FIG. 13A-B).

Example 8

Figure 14A:
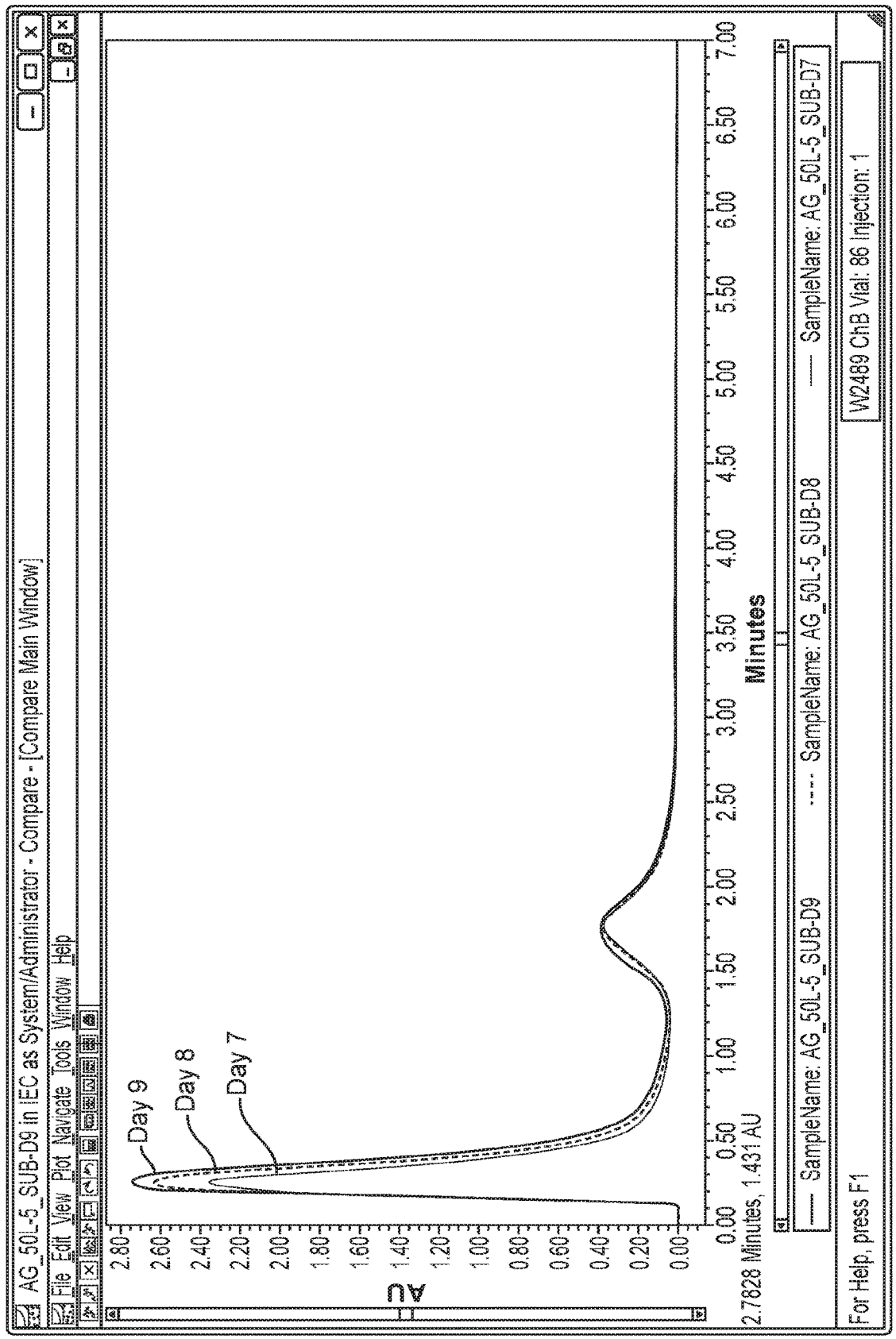
FIG. 14A is a chromatogram of day 7-9 cell culture harvest analyzed by AEX at 280 UV/visual detection.
Figure 14B:
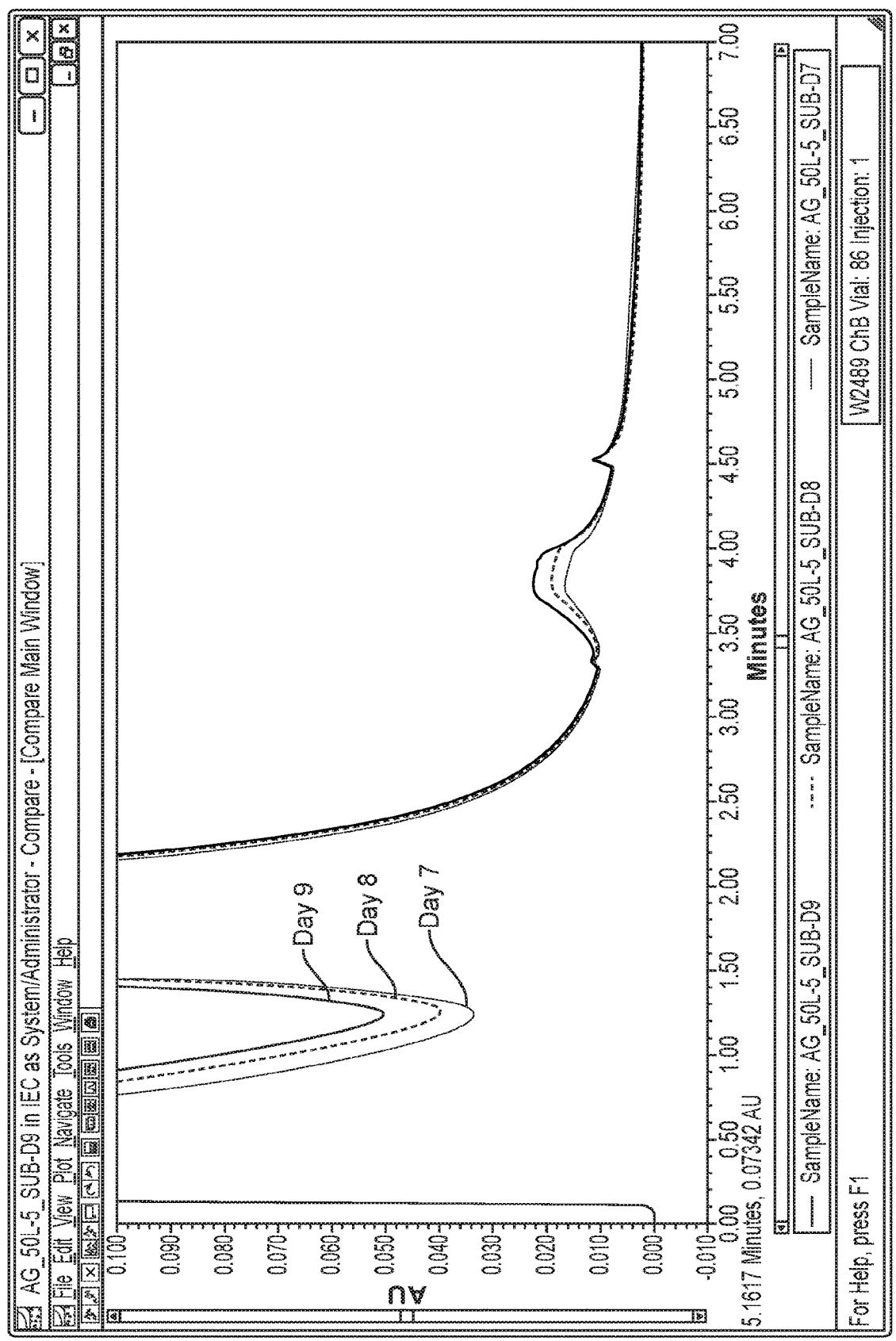
FIG. 14B is a zoomed in chromatogram of day 7-9 cell culture harvest analyzed by AEX at 280 UV/visual detection.
Figure 14C:
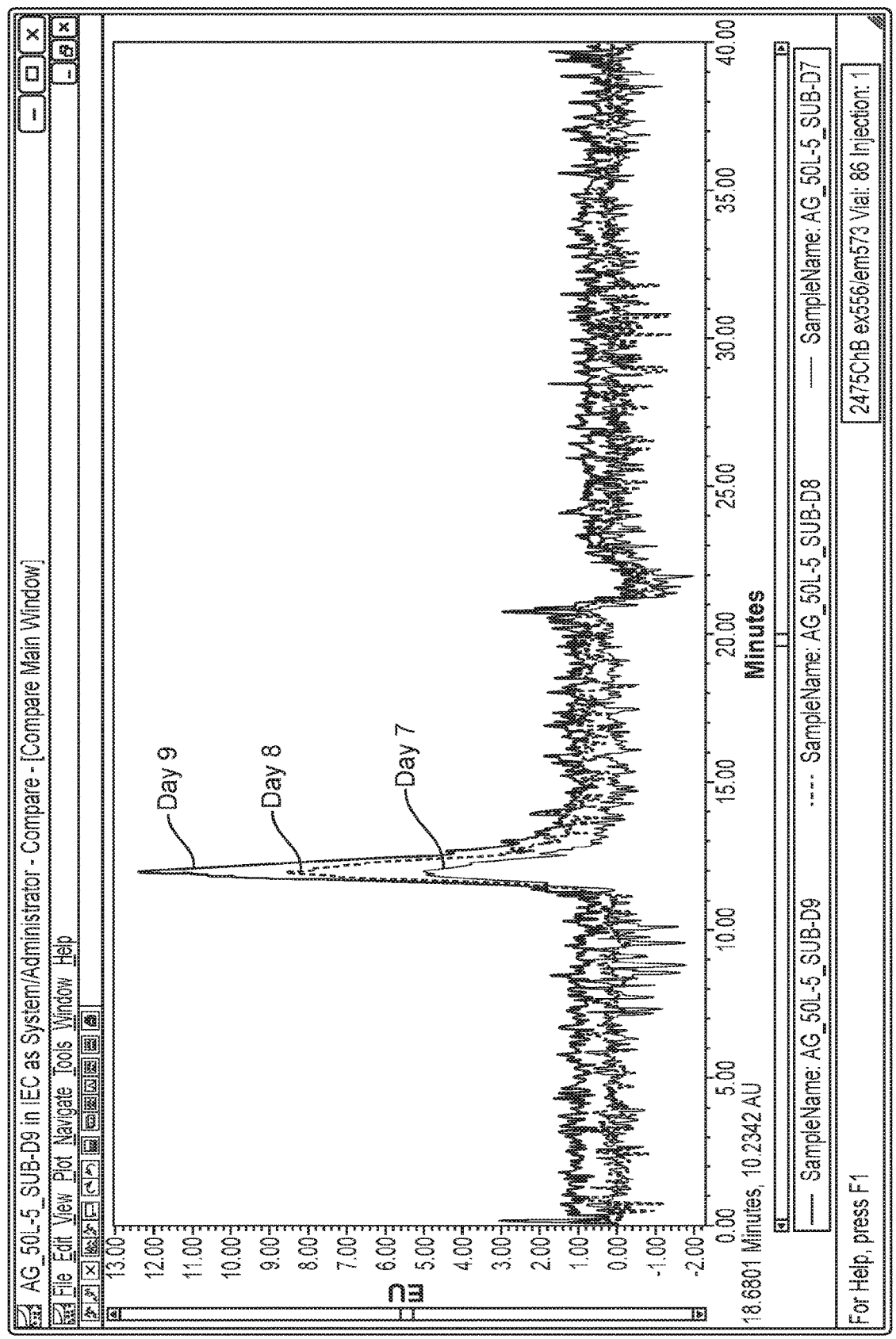
FIG. 14C is a chromatogram of day 7-9 cell culture harvest analyzed by SEC at ex: 556 nm and em: 573 nm.

Two-Dimensional Liquid Chromatography Improves Exosome Quantitation From Heterogeneous Samples To determine whether exosomes could be accurately identified and quantitated from a heterogeneous sample, cell culture media samples from HEK293 SF cells grown for 7-9 days were analyzed by 2D-LC SEC ex556/em573. As shown in FIG. 14A, samples analyzed by AEX and UV/visual detector alone failed to readily identify exosomes from the cell culture media samples. Higher magnification of the chromatogram was able to uncover the exosome traces, but they were a very minor population and could not be distinguished from adjacent peaks (FIG. 14B). In contrast, the samples analyzed by 2D-LC SEC ex556/em573were readily distinguished from background signal and detected in a concentration-dependent manner, where higher exosome yields were detected from older cultures, (i.e., Day 9 (D9) >Day 8 (D8) >Day 7 (D7)) (FIG. 14C). These results demonstrate that 2D-LC relying on AEX and SEC can readily detect exosomes from homogeneous and substantially heterogeneous preparations.

Example 9

Figure 15A:
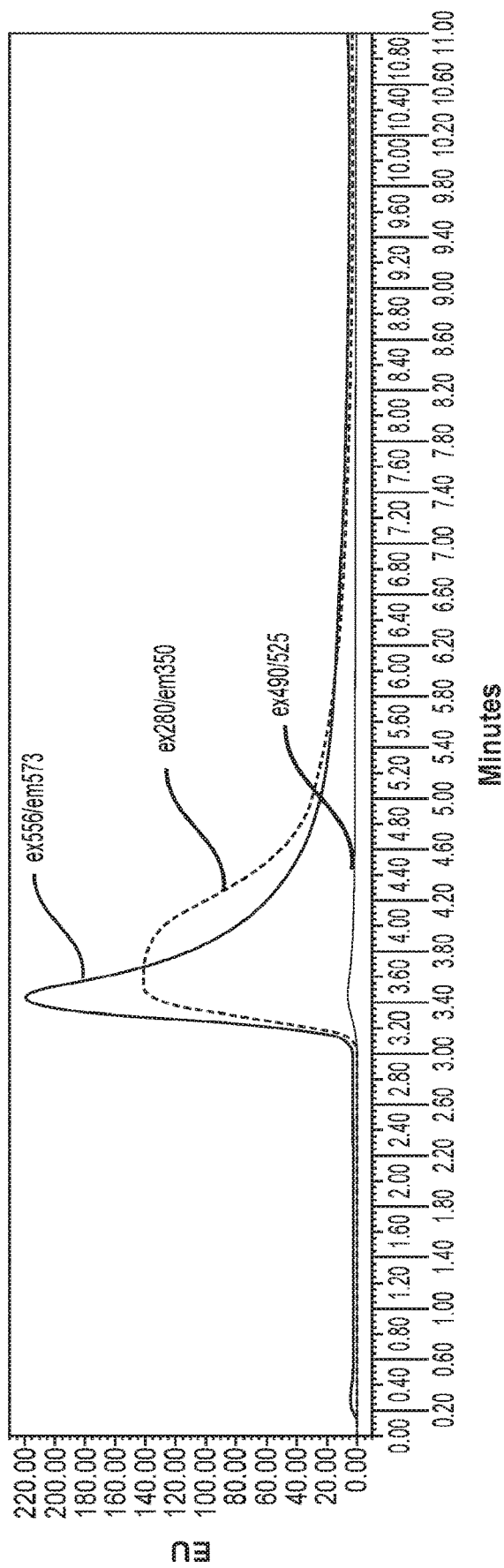
FIG. 15A is a chromatogram of Optiprep™-purified exosomes analyzed by SEC to detect fluorescent signals of proteins (ex:280 nm/em:350 nm), exosome intrinsic fluorescence (ex:556 nm/em:573 nm), and FITC fluorescence (ex:490 nm/em:525 nm).
Figure 15B:
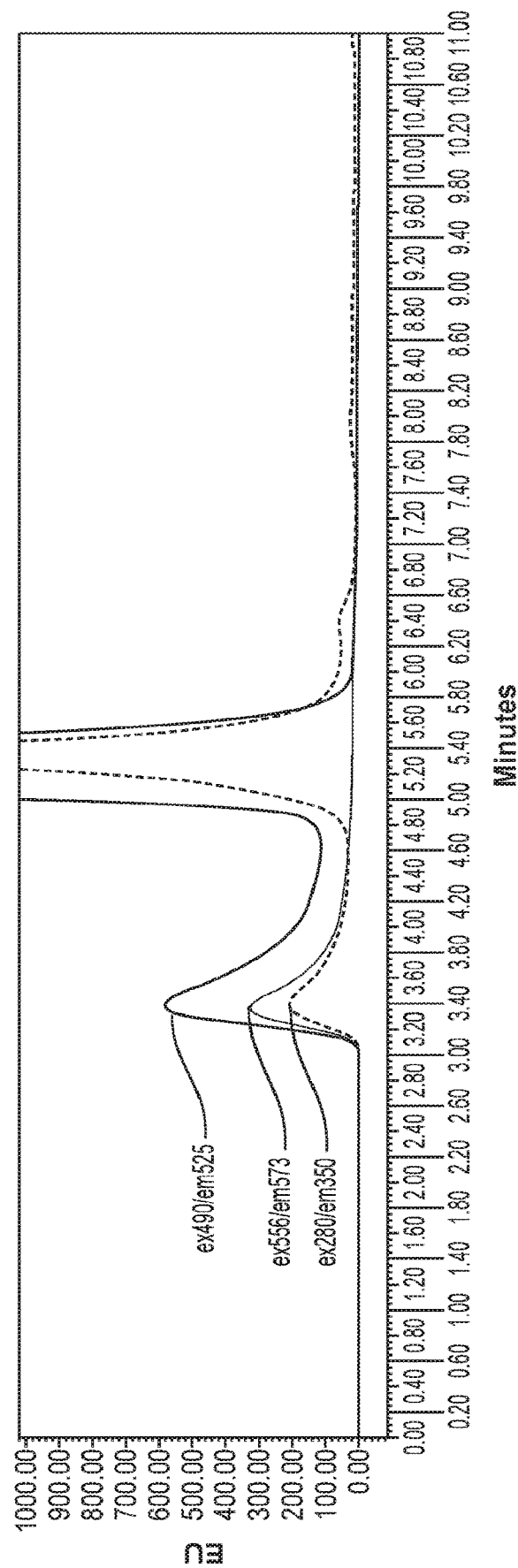
FIG. 15B is a chromatogram of Optiprep™-purified exosomes pre-incubated with an anti-CD81_FITC antibody analyzed by SEC to detect fluorescent signals of proteins (ex:280 nm/em:350 nm), exosome intrinsic fluorescence (ex:556 nm/em:573 nm), and FITC fluorescence (ex:490 nm/em:525 nm).

Affinity-SEC Demonstrates Co-Migration of Exosome Markers and ex556/em573 Intrinsic Fluorescence Signature To determine whether the exosome intrinsic fluorescence signal (ex556/em573) detected in exosome populations could physically associate with known exosome markers, purified exosome populations were analyzed by affinity SEC. First, HEK293 SF exosomes were purified by Optiprep™ density-gradient ultracentrifugation as described above. These exosomes naturally contain high levels of CD81 protein on their surface, which can be readily detected by Western blotting or bead-based exosome cytometry (data not shown). Next, either (1) purified exosome populations or (2) purified exosomes populations pre-incubated with a FITC-labeled anti-CD81 antibody were analyzed by affinity SEC. As shown in FIG. 15A, unlabeled exosomes were detected at ~3.4 minutes by protein fluorescence (ex280/em350) or by exosome intrinsic fluorescence (ex556/em573), while no signal was detected in the FITC channel (ex490/em525). In contrast, when purified exosomes were pre-incubated with an excess of anti-CD81_FITC antibody, a strong ex490/em525 signal was detected at ~3.4 min (FIG. 15B), strongly suggesting that the CD81 signal is exosome-associated and that the other fluorescence signals at ~3.4 minutes are exosome-specific. Free unbound antibody was detected in both the ex490/em525 and the ex280/em350 channels at ~5.4 minutes. Together, these results indicate that exosomes containing a known surface marker protein co-migrates with the ex556/em573 intrinsic fluorescence signal, demonstrating that monitoring ex556/em573 can be used for tracking exosome abundance and purity.

While the invention has been particularly shown and described with reference to a preferred embodiment and various alternate embodiments, it will be understood by persons skilled in the relevant art that various changes in form and details can be made therein without departing from the spirit and scope of the invention.

All references, issued patents and patent applications cited within the body of the instant specification are hereby incorporated by reference in their entirety, for all purposes.

What is claimed is:

1. A method of detecting exosomes in a sample, comprising determining an intrinsic fluorescence emission signal from the sample, wherein the intrinsic fluorescence emission signal is indicative of the presence of the exosomes within the sample, wherein the intrinsic fluorescence emission signal is determined at an emission wavelength of 550 nm to 590 nm and an excitation wavelength ranging from about 500 nm to about 600 nm.

2. The method of claim 1, wherein the intrinsic fluorescence emission signal is determined at an excitation wavelength of 530 nm to 570 nm.

3. The method of claim 1, comprising separating the sample into fractions prior to determining the intrinsic fluorescence emission signal.

4. The method of claim 3, wherein the separating comprises one or more column chromatography separation steps.

5. The method of claim 4, wherein the one or more column chromatography separation steps comprise a size-exclusion chromatography, ion-exchange chromatography, or both.

6. The method of claim 5, wherein the ion-exchange chromatography comprises an anion exchange chromatography.

7. The method of claim 1, wherein the intrinsic fluorescence emission signal is determined using a flow cell.

8. The method of claim 1, further comprising subjecting the sample to: (i) a filtration step prior to determining the intrinsic fluorescence emission signal; (ii) a centrifugation separation step prior to determining the intrinsic fluorescence emission signal; (iii) a density gradient step prior to determining the intrinsic fluorescence emission signal; or (iv) any combination of (i) to (iii).

9. The method of claim 1, wherein the sample is derived from: (i) a cell culture, (ii) a body fluid of an animal, or (iii) both.

10. The method of claim 1, further comprising quantifying the amount of the exosomes within the sample, wherein the quantifying: (i) comprises comparing the intrinsic fluorescence emission signal to the intrinsic fluorescence emission signal of a standard; (ii) is based upon the area of the curve of a chromatogram comprising the intrinsic fluorescence emission signal; (iii) comprises comparing the intrinsic fluorescence emission signal to the luminescence signal of a standard; or (iv) any combination of (i) to (iii).

11. The method of claim 10, wherein the luminescence signal of a standard:
is measured using a luminescence proximity assay; (ii) is calculated based on the relative abundance of one or more extracellular vesicle-associated proteins; or (iii) both (i) and (ii).

12. The method of claim 11, wherein the one or more extracellular vesicle-associated proteins are selected from the group consisting of CD9, CD81, CD63, and combinations thereof.

13. The method of claim 1, wherein the exosome comprises a therapeutic payload.

14. The method of claim 1, wherein the intrinsic fluorescence emission signal is determined at an excitation wavelength of about 556 nm and at an emission wavelength of about 573 nm.

* * * * *

UNITED STATES PATENT AND TRADEMARK OFFICE
CERTIFICATE OF CORRECTION

PATENT NO. : 12,158,424 B2  
APPLICATION NO. : 17/706281  
DATED : December 3, 2024  
INVENTOR(S) : Damian J. Houde et al.

Page 1 of 1

It is certified that error appears in the above-identified patent and that said Letters Patent is hereby corrected as shown below:

In the Claims

Column 20, Line 8 (Claim 11): -- "(i)" -- should be added before -- "is measured using a luminescence proximity assay;" --

Signed and Sealed this  
Twenty-first Day of January, 2025

Coke Morgan Stewart  
*Acting Director of the United States Patent and Trademark Office*